ACETOACETAMIDE COUPLERS IN WHICH THE NON-OXO CARBON ATOM OF THE ACETO GROUP IS A TERTIARY CARBON ATOM
Original Filed May 4, 1964 3 Sheets-Sheet 1
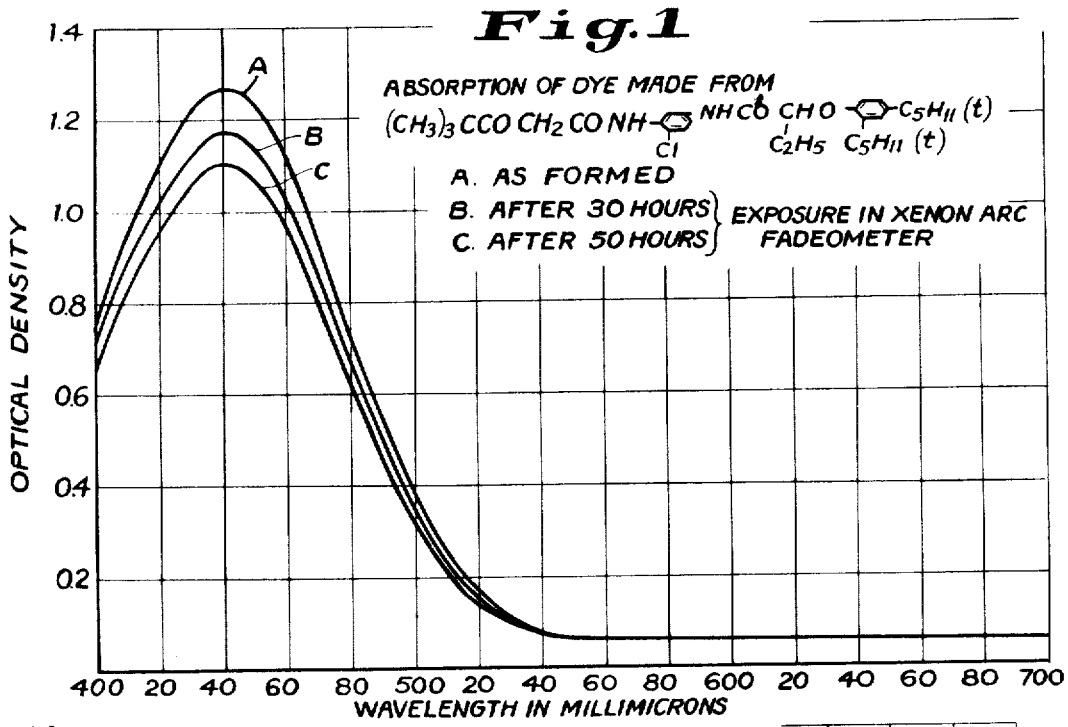
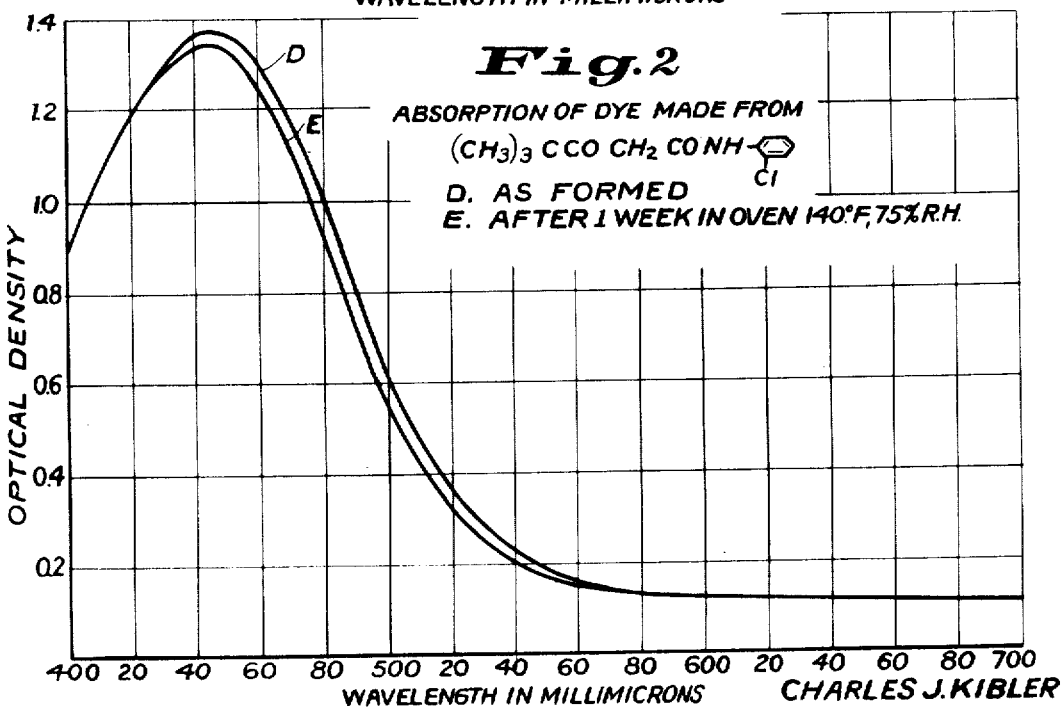
CHARLES J. KIBLER
ARNOLD WEISSBERGER
INVENTORS
BY R. Frank Smith
Ray Carter Livermore
ATTORNEY & AGENT

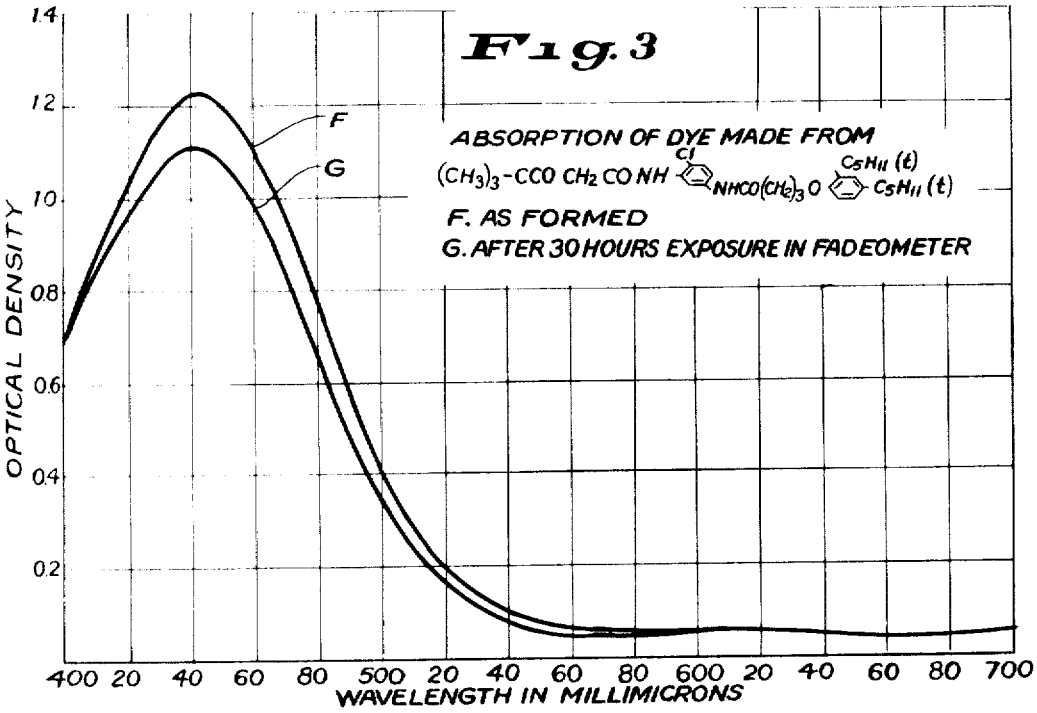
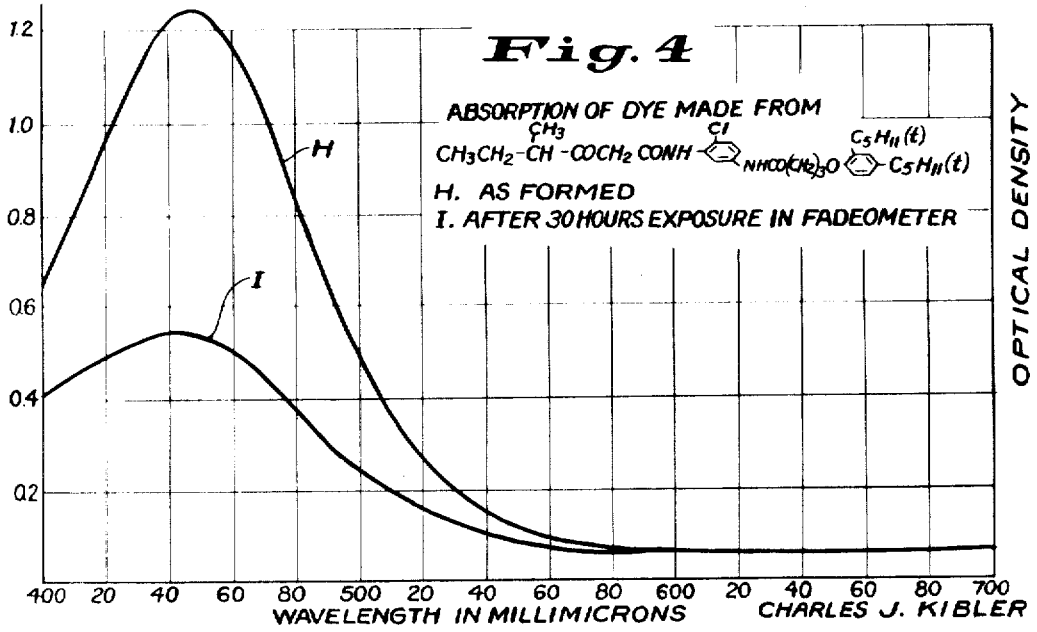
CHARLES J. KIBLER
ARNOLD WEISSBERGER
INVENTORS
BY R. Frank Smith
Ray Carter Livermore
ATTORNEY & AGENT CHARLES J. KIBLER
ARNOLD WEISSBERGER
INVENTORS
BY R. Frank Smith
Ray Carter Livermore
ATTORNEY & AGENT United States Patent Office Re. 28,055
Reissued June 25, 1974

28,055

ACETOACETAMIDE COUPLERS IN WHICH THE NON-OXO CARBON ATOM OF THE ACETO GROUP IS A TERTIARY CARBON ATOM

Arnold Weissberger, Rochester, N.Y., and Charles J. Kibler, Kingsport, Tenn., assignors to Eastman Kodak Company, Rochester, N.Y.

Original No. 3,384,657, dated May 21, 1968, Ser. No. 516,802, Sept. 28, 1965, which is a division of application Ser. No. 364,450, May 4, 1964, now Patent No. 3,265,506, which is a continuation-in-part of abandoned application Ser. No. 25,295, Apr. 28, 1960. Application for reissue Aug. 9, 1972, Ser. No. 165,794
Int. Cl. C07c *143/52*
U.S. Cl. 260—507 R 9 Claims

Matter enclosed in heavy brackets [ ] appears in the original patent but forms no part of this reissue specification; matter printed in italics indicates the additions made by reissue.

ABSTRACT OF THE DISCLOSURE

Acetoacetamide couplers in which the non-oxo carbon atom of the aceto group is a tertiary carbon atom are advantageously used as yellow dye-forming couplers in photography; the couplers are characterized by producing dyes upon color development that have very desirable absorption characteristics with relatively low absorption in the green and red areas of the spectrum, exceptionally good stability to prolonged exposure to light and the couplers when incorporated in photographic emulsion layers exhibit considerably less "print out" on prolonged exposure to light and less "yellowing" than prior art couplers such as the alpha-benzoyl analogues.

Figure 5:
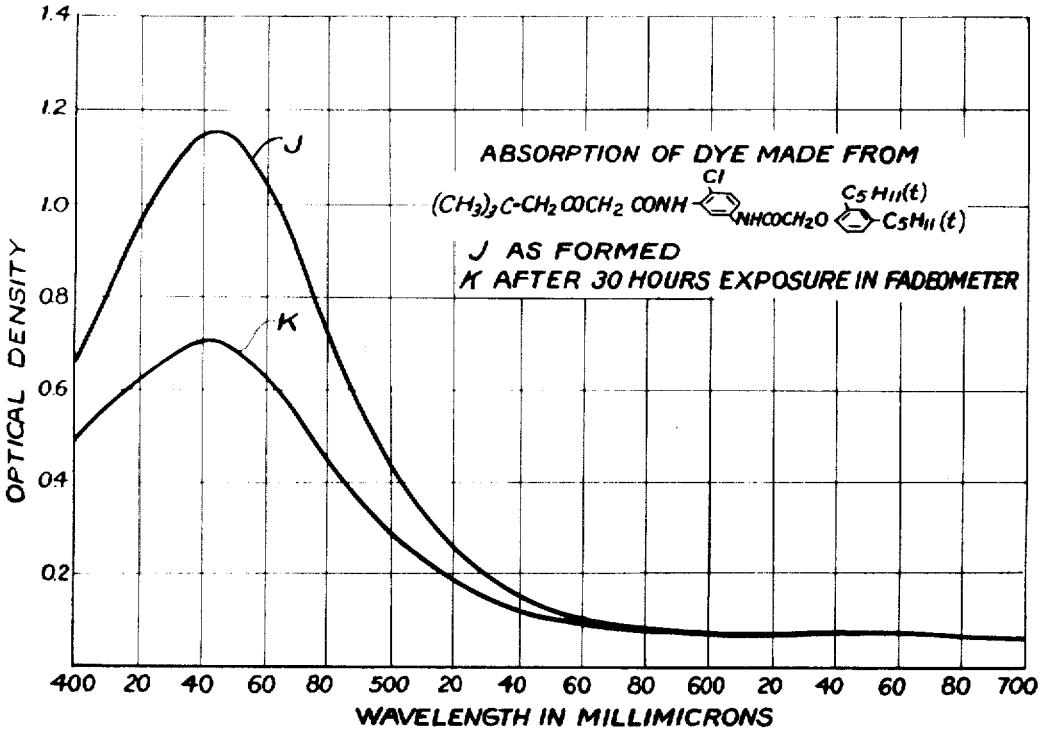

This is a divisional application of U.S. patent application Ser. No. 364,450, Yellow-Forming Couplers, filed May 4, *1964* [1962] now U.S. Patent 3,265,506, issued Aug. 9, 1966. U.S. Ser. 364,450 is a continuation-in-part application of Weissberger and Kibler U.S. application Ser. No. 25,295, filed Apr. 28, 1960, now abandoned.

This invention relates to photography and particularly to a new class of yellow dye forming coupler compounds, and their use in photographic elements for color photography.

The formation of colored photographic images in multilayer elements by coupling the oxidation products of aromatic amino developing agents with color forming or coupling compounds is well known. In these processes the subtractive process for color formation is ordinarily used and the image dyes are intended to be of the complementary primary colors, cyan or blue-green, magenta and yelow. The couplers which produce the cyan dyes are usually phenols or naphthols, those producing the magenta dyes are ordinarily pyrazolones and those producing the yellow dyes are ordinarily compounds containing a methylene group having 2 carbonyl groups attached to it. In multilayer elements for color photography the cyan couplers are usually incorporated in the red sensitive layer, the magenta coupler in the green sensitive layer and the yellow coupler in the blue sensitive layer. The dyes produced by coupling are azomethine, indoamines or indophenols depending upon the composition of the coupler and of the developer.

It is important that the dyes formed from couplers used in color photography have the proper light absorption characteristics. Thus, ideally the yellow dye should have a high absorption for blue light and a low but more or less uniform absorption for green and red light. The dyes from many of the available couplers do not possess these absorption characteristics to the desired extent. For example, the yellow dyes from some of the prior art couplers are an orange yellow because they absorbed more green light and less red light than is desired. In order to use such couplers it has been necessary to increase the red light absorption of the resulting dye by mixing a small amount, of the order of 4–15%, of a cyan dye forming coupler with the yellow dye forming coupler and incorporating this mixture in the blue sensitive layer.

The yellow dyes produced from many of the well known couplers are not as stable as is desired.

Many of the known couplers are unstable themselves and when incorporated in photographic elements are subject to producing discoloration, and effect called "printout" when caused by exposure to light over a period of time or "yellowing," an effect produced by continued exposure of the coupler to heat. Special processing treatment has been required to reduce the "printout" and "yellowing" effect in photographic emulsions containing some prior art couplers. For example, such residual prior art couplers have been removed from the photographic emulsions after development, bleaching and fixing by treatment with water solutions of various alkalis and a water soluble solvent such as methanol, 1,2-propanediol, 1,3-butanediol, 2,3-butanediol, 2-methoxyethanol, ethanol, ethyleneglycol, n-propanol, iso-propanol, 2-methyl-2,4-pentanediol, beta-beta'-dihydroxy ethylether, dimethylformamide, propyleneglycol-1,3 - ethyleneglycolmonobutylether, diethyleneglycoldiethylether, etc.

It is therefore an object of the present invention to provide a novel class of yellow dye forming couplers which are especially well suited for incorporation in photographic emulsion layers.

Another object is to provide a class of yellow dye forming couplers which produce dyes having unusually good light absorption characteristics.

Another object is to provide a novel class of couplers which has good stability and is not subject to "printout" and "yellowing" when incorporated in photographic elements.

A further object is to provide a novel class of couplers which produce dyes of exceptional stability.

Other objects will appear from the following description of our invention.

These objects are accomplished according to our invention by the use of a new class of acetoacetanilide type coupler in which the non-oxo carbon atom of the aceto group is a tertiary carbon atom. These couplers can be advantageously represented by the formulas:

I

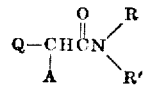

and

IA

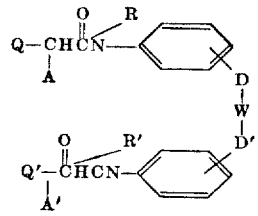

wherein Q and Q' each represent an acyl group having from 5 to 32 carbon atoms in which the carbon atom attached to the carbonyl radical of said acyl group is a tertiary carbon atom substituted with (a) alkyl radicals having 1 to 18 carbon atoms, such as methyl, ethyl, propyl, isopropyl, butyl, tert. butyl, amyl, hexyl, isohexyl, heptyl, octyl nonyl, decyl, dodecyl, tridecyl, pentadecyl, hexadecyl, heptadecyl, octadecyl etc. (provided not more than 2 of said alkyl radicals are secondary or tertiary alkyl radicals), or (b) alkyl radicals which in turn are substituted with heteroatoms such as halogen, e.g., chlorine, bromine, iodine, etc., or (c) alkoxy radicals such as methoxy, ethoxy, propoxy, butoxy, pentoxy, hexoxy, heptoxy, octoxy, nonoxy, decoxy, dodecoxy, tridecoxy, pentadecoxy, hexadecoxy, heptadecoxy, octadecoxy, etc., or (d) alkoxyalkyl radicals having from 2 to 18 carbon atoms in which the alkoxy moiety and alkyl moiety are as defined above, for example, and can be radicals such as methoxymethyl, methoxyoctyl, methoxyheptadecyl, propoxymethyl, propoxyamyl, propoxypentadecyl, hexadecoxyethyl, etc., or the tertiary carbon atoms attached to the carbonyl radical is substituted as described above but with either 1 or 2 of (a), (b), (c) or (d) radicals above replaced by (e) an aryl radical, e.g., a phenyl radical, a tolyl radical, etc.; or the tertiary carbon attached to the carbonyl radical is an integral component of a cycloalkyl radical such as a 1-alkyl-1-cyclohexyl radical in which the alkyl radical has from 1 to 18 carbon atoms as defined above, such as 1-methyl-1-cyclohexyl, 1-ethyl-1-cyclohexyl, 1-propyl-1-cyclohexyl, 1-hexyl-1-cyclohexyl, 1-octadecyl-1-cyclohexyl, etc., a 1-alkoxy-1-cyclohexyl radical in which the alkoxy radical contains from 1 to 18 carbon atoms as defined above, such as 1 - methoxy - 1 - cyclohexyl, 1 - ethoxy - 1 - cyclohexyl, 1 - propoxy - 1 - cyclohexyl, 1 - nonoxy - 1 - cyclohexyl, 1 - octadecoxy - 1 - cyclohexyl, a 1 - alkoxyalkyl - 1 - cyclohexyl radical in which the alkoxyalkyl radical has from 2 to 18 carbon atoms as defined above, such as 1-methoxymethyl-1-cyclohexyl, 1 - methoxybutyl-1-cyclohexyl, 1-hexadecoxymethyl-1-cyclohexyl, etc., a 1-aryl-1-cyclohexyl radical such as 1-phenyl-1cyclohexyl, 1 - tolyl-1-cyclohexyl, etc., a ring-substituted 1-alkyl-1 - cyclohexyl radical, a substituted 1-alkoxy-1-cyclohexyl radical, a substituted 1-alkoxyalkyl-1-cyclohexyl radical as defined above in which the substituent is an aryl radical such as phenyl, tolyl, etc., an alkyl radical having from 1 to 12 carbon atoms including those defined above, an alkoxy radical having from 1 to 12 carbon atoms including those defined above, such that the acyl groups Q and Q' each have a total of from 8 to 31 carbon atoms; or the tertiary carbon atom attached to the carbonyl radical is an integral component of a bicyclic radical, e.g., a terpenyl radical, such as 7,7-dimethylnorbornyl, 2-alkyl-7,7-dimethylnorbornyl radicals in which the alkyl group has from 1 to 18 carbon atoms as defined above, such as 2-methyl-7,7-dimethylnorbornyl, 2-pentadecyl-7,7-dimethylnorbornyl, 2-octadecyl - 7,7 - dimethylnorbornyl, etc., a 2-aryl-7,7-dimethylnorbornyl radical such as 2-phenyl-7,7-dimethylnorbornyl, 2-tolyl-7,7-dimethylnorbornyl, etc., A and A' each represents a hydrogen atom, a halogen atom such as chlorine, or bromine, or a —SB radical in which B is a heteocyclic radical such as 1,3,4-oxadiazolyl, benzoxazole, phenyltetrazolyl, etc., a substituted phenyl radical such as a 3-alkylcarbamylphenyl in which the alkyl group has from 1 to 18 carbon atoms, such as 3-methylcarbamylphenyl, 3 - ethylcarbamylphenyl, 3-propylcarbamylphenyl, 3 - hexylcarbamylphenyl, 3-decylcarbamylphenyl, 3-tetradecylcarbamylphenyl, 3-octadecylcarbamylphenyl, etc., a 3-alkyl-4-methoxyphenyl radical, in which the alkyl group has from 1 to 18 carbon atoms such as 3-methyl-4-methoxyphenyl, 3-propyl-4-methoxyphenyl, 3-nonyl-4-methoxyphenyl, 3-octadecyl-4-methoxyphenyl, etc., a dialkyl-4-aminophenyl radical in which the alkyl groups have from 1 to 18 carbon atoms such as 2,6-dimethyl-4-aminophenyl, 2,6-diethyl-4-aminophenyl, 2,6-dipropyl-4-aminophenyl, 2,6-dioctyl-4-aminophenyl, 2,6-ditetradecyl-4-aminophenyl, 2,6 - dioctadecyl-4-aminophenyl, 3,5 - dimethyl - 4 - aminophenyl, 3,5dipropyl-4-aminophenyl, 3,5-didodecyl - 4 - aminophenyl, octadecyl, etc.; and R and R' each represent the same or a different group, e.g., an aryl group such as phenyl, 2-chlorophenyl, 4-sulfophenyl, 2-dimethylaminophenyl, etc., a 2-halo-5-alkamidophenyl radical, e.g., 2-chloro-5-[alpha-(2,4-di-tert - amylphenoxy)acetamido]phenyl, 2-chloro-5-[alpha-(2,4-di-tert-amylphenoxy)butyramido]phenyl, 2-chloro-5-[alpha-(2,4 - di - tert - amylphenoxy)amylamido]phenyl, 2-chloro-5-[γ-(2,4 - di - tert - amylphenoxy)butyramido]phenyl, 2-chloro-5-(4-methylphenyl sulfonamido)phenyl, 2fluoro-5-(N - hexylamido)phenyl, etc., a 2-methoxy-5-alkamidophenyl radical, e.g., 2-methoxy - 5 - (2,4-di-tert-amylphenoxy)acetamidophenyl, 2 - methoxy-5-[alpha-(2,4-di-tert-amylphenoxy)butyramido]phenyl, etc., a 4-alkamidophenyl radical, e.g., 4-(2,4 - di - tert-amylphenoxy)acetamidophenyl, 4-[γ - (2,4-di-tert-amylphenoxy)butyramido]phenyl, etc., a 4 -methoxyphenyl radical, e.g., 4-[N-(γ-phenylpropyl) - N - (p - tolyl)carbamylmethoxy]phenyl, 4 - [N - (γ - phenylhexyl)-N-(p-tolyl)carbamylmethoxy]phenyl, etc., a 4-sulfamylphenyl radical, e.g., 4-[N-(γ - phenylpropyl)-N-(p-tolyl)sulfamyl]phenyl, 4-[N-(phenylethyl)-N-(p-tolyl)sulfamyl]phenyl, etc., a 2-chloro-5-sulfonamidophenyl radical, e.g., 2 - chloro-5-(p-toluenesulfonamido)phenyl, 2 - chloro-5-(benzenesulfonamido)phenyl, etc., a 3,5-dicarboxyphenyl radical, esters of 3,5-dicarboxyphenyl radicals, e.g., 3,5-dicarbomethoxyphenyl 3,4 - dicarbohexoxyphenyl, 3,5-dicarbododecoxyphenyl, 3,5 - dicarbopentodecoxyphenyl, 3,5-dicarbooctadecoxyphenyl, etc., a 2-phenoxy-5-carbamylphenyl radical, e.g., 2-(2,4-di-tert-amylphenoxy) - 5 - (3,5-dicarbomethoxyphenylcarbamyl)phenyl, 2 - (2,4-di-tert-amylphenoxy) - 5 - (N-morpholinocarbonyl)phenyl, etc., a 3,5-dicarbamylphenyl radical, etc.; the hydrogen atom; an alkyl group of 1–18 carbon atoms, e.g., methyl, ethyl, decyl, octadecyl, carboxymethyl, carboxyoctadecyl, carbomethoxymethyl, carbobutoxypropyl, beta - hydroxyethyl, γ-chloropropyl, γ - acetamidopropyl, γ-methylcarbamylbutyl, beta-methylsulfonamidoethyl; and a heterocyclic radical selected from those of the thiophene series, e.g., a 5-carbethoxythiophenyl-(2)-radical, those of the furane series, e.g., a 5-carbethoxy-furyl radical, those of the thiazole series, e.g., a 4-methyl-thiazolyl-(2)-, a 4 -phenylthiazolyl-(2)-, a 4 - furyl - thiazolyl-(2)-, a 4-methyl-5-carboxyethyl-thiazolyl-(2)-, a 4,5-diphenylthiazolyl-(2)-, a 4-carboxymethyl-thiazolyl-(2)-, a 4-m- or p-acylaminophenyl-thiazolyl-(2)-, a 4,5-dicarbethoxy-thiazolyl-(2)-, a 4 - methyl-5-carbethoxymethyl-thiazolyl-(2)-, a 4-methyl-5-carbethoxythiazolyl-(2)-, a 5-carboxy-thiazolyl-(2)-, a 5-carbomethoxy-thiazolyl-(2)-, a 5-carbethoxy-thiazolyl-(2)-, a 5-carbethoxy-thiazolyl-(2)-, or a benzthiazolyl-(2)-radical, those of the oxazole series, those of the imidazole series, e.g., a benzimidazyl-(2)-radical, those of the pyridine series, e.g., a 5-acylamino-pyridyl-(2)-, a pyridyl-(4)-, or a quinolyl-(2)-radical, those of the 1,3- or 1,4-diazine series, e.g., a 2,6-dihydroxy-4-methyl pyrimidyl-(5)-radical, those of the 1,3,4-thiadiazole series, e.g., a 5-carbomethoxyethyl-1,3,4-thiadiazolyl-(2)-radical, those of the 1,3,4-oxodiazole series, those of the 1,2,4-triazole series e.g., a 1-(p - carbethoxyphenyl)-3-aminotriazolyl-(5)- or a 1 - (o - carbethoxyphenyl)-3-aminotriazolyl-(5)- or a 1 - (p - carbethoxyphenyl)trioxolyl-(5)-radical and those of the 1,3,5-triazine series; D and D' each represent the same or a different bivalent group such as the $$-NH\overset{O}{\overset{\|}{C}}-$$

group, the $$-\overset{O}{\overset{\|}{C}}NH-$$

group, the $—NHSA_2—$ group, the $—SO_2NH—$ group, etc.; and W represents a phenylene group, e.g., an o-phenylene, a p-phenylene or an m-phenylene group or an alkylene group having from 1–18 carbon atoms, e.g., methylene, butylene, decylene, octadecylene, etc.

By tertiary carbon atoms we mean a carbon atom which is in turn connected to 3 other carbon atoms either directly or through an oxygen atom (as in alkoxy) which are a part of individual radicals, or a carbon atom which is in turn connected to three other carbon atoms which are members of cyclic or bicyclic radicals.

Our couplers which have only individual radicals attached to the tertiary carbon atoms can also be represented by the formulas:

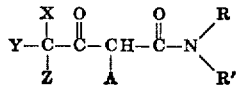

and

IIA

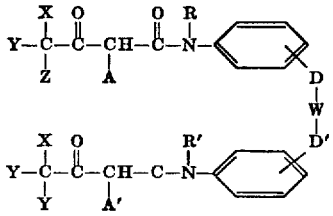

in which X, Y and Z each represent (a) an alkyl radical having from 1–18 caron atoms, e.g., methyl, ethyl, isopropyl, butyl, tertiary butyl, isohexyl, isooctyl, octadecyl, etc., provided that not more than two of the said alkyl radicals is a secondary or tertiary alkyl radical, (b) an alkyl radical as defined above substituted with hetero atoms, e.g., halogen, (c) an alkoxy radical having from 1 to 18 carbon atoms, e.g., methoxy, butoxy, hexoxy, dodecoxy, pentadecoxy, octadecoxy, etc., (d) an alkoxyalkyl radical having from 1 to 18 carbon atoms in which the alkoxy and alkyl radicals are as defined above, the total number of carbon atoms in X plus Y plus Z is no more than 30 in any of the radicals described above, and A, R, R', D, D' and W are as previously described.

The following are representative couplers used to illustrate our invention and are not to be considered as limiting the invention.

| Coupler number | Name |
|---|---|
| 1 | Alpha-pivalylacetanilide. |

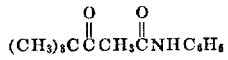

| | |
|---|---|
| 2 | Alpha-pivalyl-2-chloroacetanilide. |
| 3 | Alpha-pivalyl-2-(2 dimethylaminino)acetanilide. |
| 4 | Alpha-pivalyl-5-[alpha'-(2,4-di-tert-amylphenoxy)-acetamido]-2-chloroacetanilide. |

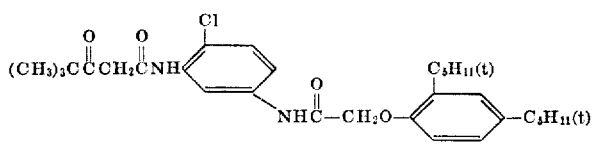

| | |
|---|---|
| 5 | Alpha-pivalyl-alpha-chloro-5-[alpha'-(2,4-di-tert-amylphenoxy)acetamido]-2-chloroacetanilide. |
| 6 | Alpha-(alpha'-methoxyisobutyryl)-5-[alpha' '-(2,4-di-tert-amylphenoxy)acetamido] 2-chloroacetanilide. |
| 7 | Alpha-(methoxypivalyl)-5-[alpha'-(2,4-di-tert-amylphenoxy)acetamido]-2-chloro acetanilide. |
| 8 | Alpha-pivalyl-5-[alpha'-(2,4-di-tert-amylphenoxy)-acetamido]-2-methoxyacetan-ilide. |
| 9 | Alpha-pivalyl-5-[alpha'-(2,4-di-tert-amylphenoxy)-butyramido]-2-chloroacetanilide. |
| 10 | Alpha-pivalyl-5-[γ'-(2,4-di-tert-amylphenoxy)-butyramido]-2-chloroacetanilide. |
| 11 | Alpha-(chloropivalyl)-5-[γ'-(2,4-di-tert-amylphenoxy)-butyramido]-2-chloroacetanilide. |
| 12 | Alpha-(alpha-methoxyisobutyryl)-5-[γ''-(2,4-di-tert-amylphenoxy)butyramido]-2-chloroacetanilide. |
| 13 | Alpha-pivalyl-alpha-[2-(5-phenyl-1,3,4-oxadiazolyl-thio)]-5-[γ-(2,4-di-tert-amy lphenoxy)2-butyramido-]2-chloroacetanilide. |

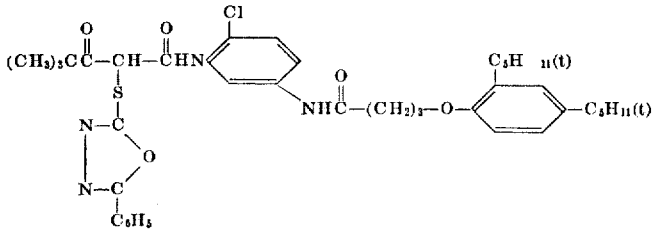

| | |
|---|---|
| 14 | Alpha-pivalyl-4 [N-(γ-phenylpropyl)-N-(p-tolyl)-carbamylmethoxyl]acetanilide. |
| 15 | Alpha-pivalyl-4 [N-(γ-phenylpropyl)-N-(p-tolyl)-sulfamyl]acetanilide. |

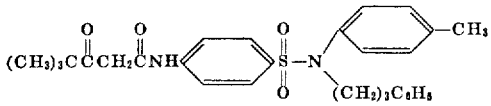

| | |
|---|---|
| 16 | Alpha-pivalyl-5-(p-toluenesulfonamido)-2-chloroacetanilide. |
| 17 | Alpha-pivalyl-2-(2,4-di-tert-amylphenoxy)-5-N-(morpholinocarbonyl)acetanilide. |
| 18 | Alpha-pivalyl-alpha-(3-octadecylcarbamylphenylthio)-3,5-di-carbomethoxyacetanilide. |
| 19 | Alpha-pivalyl-3,5-dicarboxyacetanilide. |
| 20 | Alpha-pivalyl-alpha-(3-tetradecylcarbamylphenylthio)-3,5-dicarboxyacetanilide. |
| 21 | Alpha-pivalyl-3,5-dicarbododecyloxyacetanilide. |
| 22 | Alpha-pivalyl-3,5-dicarbamylacetanilide. |
| 23 | Alpha-pivalyl-3,5-di-(N-octylcarbamyl)acetanilide. |
| 24 | Alpha-pivalyl-4 sulfoacetanilide potassium salt. |
| 25 | Alpha-pivalyl-alpha-(3-octadecylcarbamylphenylthio)-4-sulfoacetanilide potassium salt. |
| 26 | Alpha-(alpha',alpha'-dimethylstearoyl).4.sulfoacetanilide potassium salt. |

TABLE—Continued

| Coupler number | Name |
|---|---|
| 27 | Alpha-(alpha',alpha',di-n-amyl)heptanoyl-5-heptanamido-2-fluoroacetanilide. |
| 28 | Alpha-(7,7-dimethylnorbornane-1-carbonyl)alpha (3 octadecylcarbamylphenylthio) 3,5 dicarboxyacetanilide. |

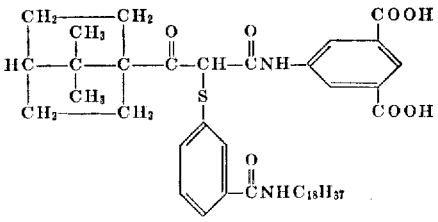

| | |
|---|---|
| 29 | Alpha-(7,7-dimethylnorbornane-1-carbonyl)-5-[γ-(2,4-di-tert-amylphenoxy)butyramido]-2-chloroacetanilide. |
| 30 | Alpha-(1-methylcyclohexane-1-carbonyl)-5-[γ-(2,4-di-tert-amylphenoxy)butyramido] 2-chloroacetanilide. |
| 31 | Alpha-pivayl-2,5-dichloro-4-(N-methyl-N-octadecyl-sulfamyl)acetanilide. |
| 32 | Alpha-pivalyl-2-chloro-4-(N-methyl-N-octadecyl-sulfamyl)acetanilide. |
| 33 | Alpha-pivalyl-2-chloro-4-(N-phenyl-N-octadecyl-sulfamyl)acetanilide. |
| 34 | Alpha-pivalyl-2-chloro-4-[N-benzyl-N-(1-methyldodecyl)-sulfamyl]acetanilide. |
| 35 | Alpha-pivalyl-2,5-dichloro-4-(N-phenyl-N-octadecyl-sulfamyl)acetanilide. |
| 36 | Alpha-pivalyl-2,5-dichloro-4-[N-benzyl-N-1-methyldodecyl)sulfamyl]acetanilide. |
| 37 | Alpha-(alpha,alpha-diphenylbutyryl)-5-[γ-(2,4-di-tert-amylphenoxy)butyramido]-2-chloroacetanilide. |
| 38 | Alpha-(alpha-phenylisobutyryl)-5-[γ-(2,4-di-tert-amylphenxoy)butyramido]-2-chloroacetanilide. |
| 39 | Alpha-(alpha phenylisobutyryl)-alpha-(3-octadecyl carbamylphenylthio)-4-sulfonacetanilide potassium salt monohydrate. |
| 40 | Alpha-(alpha-phenylisobutyryl)-alpha-(3-octadecyl-carbamylphenylthio)-3,5-dicarboxyacetanilide. |
| 41 | Alpha-pivalyl-N,N bis(carbethoxymethyl)acetamide. |
| 42 | Alpha-pivalyl-N-(2 thiazolyl)acetamide. |
| 43 | Alpha-pivalyl-alpha-octadecylthio-3,5-dicarboxy-acetanilide. |
| 44 | Alpha-pivalyl-alpha-(3 octadecylcarbamylphenylthio)-N,N-bis(carboxymethyl) acetamide. |
| 45 | Alpha-pivalyl-N-(4,5-dicarbethoxy-2-thiazolyl)-acetamide. |
| 46 | N,N'-bis[4-(alpha-pivalylacetamide)-benzenesulfonyl]-hexamethylenediamine. |

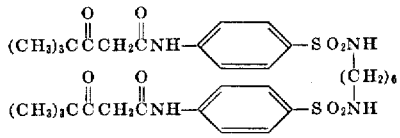

The compounds of our invention are prepared to advantage by the reaction of the appropriate acylacetic ester having the formula:

III

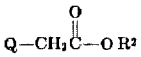

in which Q is as defined previously and $R^2$ is a lower alkyl group, with an appropriate amine having the formula:

IV

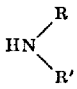

in which R and R' are as defined previously to give a compound of the formula

V

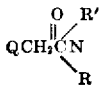

These reactions are usually carried out in a suitable solvent, such as, xylene, while the mixture is stirred and refluxed. Compounds of Formulas I and II in which A is other than the hydrogen atom are prepared by treating the appropriate compound of Formula V with an appropriate reagent, e.g., an aryl sulfenyl halide prepared by the reaction of an aryl disulfide or aryl mercaptan with a halogen; or a heterocyclic sulfenyl halide prepared by reaction of a heterocyclic disulfide or a heterocyclic mercaptan with a halogen, sulfuryl chloride, etc.; an alkyl disulfide or alkyl mercaptan with a halogen, sulfuryl chloride, etc.

Compounds of Formula IA are prepared to advantage by reacting (1) a compound of Formula I in which R' represents an aminophenyl group, a chlorosulfonylphenyl group or a chlorocarbonylphenyl group with (2) a compound having the formula:

VI L—W—L' in which L and L' each represents a group, such as the

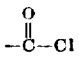

group, the $—SO_2Cl$ group or the $—NH_2$ group and the condensation of two moles of the compound of Formula I with one mole of L—W—L' forms one molecule of the new coupler and two molecules of HCl. The reaction is conducted in an inert dry solvent such as dry dioxane and in the presence of a tertiary amine such as triethylamine as an acid acceptor.

Coupler 1 was prepared by the reaction of equimolar quantities of ethyl pivalylacetate and aniline in refluxing xylene (600 ml./mole of reactants). After a reaction period of 1 hour, the solution was cooled; the product was obtained as coarse white crystals having a M.P. of 77–79° C.

Coupler 2 was prepared from ethyl pivalylacetate and 2-chloroaniline by the procedure described for coupler 1, and was obtained as a solid with a M.P. of 48–50° C.

Coupler 3, prepared from ethyl pivalylacetate and 2-dimethylaminoaniline by the procedure described for coupler 1, was obtained as a solid with a M.P. of 68–70° C.

Coupler 4 was prepared by using the following steps:

Step 1.—α-(2,4-di-tert-amylphenoxy)-4-chloro-3-nitroacetanilide

To a stirred mixture of 677 g. of anhydrous sodium acetate, 8 liters of glacial acetic acid, and 448 g. of 4-chloro-3-nitroaniline was added 847 g. of (2,4-di-tert-amylphenoxy)-acetyl chloride. The resulting suspension was stirred for 5 hours at room temperature, then poured into 20 liters of water. The solid obtained was recrystallized from alcohol to give 830 g. of white flakes, M.P. 157–158° C.

Step 2.—5[α-(2,4-di-tert-amylphenoxy)-acetamido]-2-chloroaniline

A solution of 44.6 g. of α-(2,4-di-tert-amylphenoxy-4-chloro-3-nitroacetanilide in 200 ml. of absolute ethanol was placed in a Parr shaker bottle and hydrogenated at room temperature in the presence of Raney nickel catalyst. The initial pressure of hydrogen was 50 p.s.i., and the reduction was complete in 1 to 1½ hours. The mixture was heated to boiling and filtered, and the filtrate was added to 1500 ml. of water. There was thus obtained 32 g. of product, M.P. 117–118° C.

Step 3.—α-Pivalyl-5-[α'-(2,4-di-tert-amylphenoxy)-acetamido]-2-chloroacetanilide To a refluxing solution of 318 g. of 5-[α-(2,4-di-tert-amylphenoxy)-acetamide]-2-chloroaniline in 2 liters of xylene was added 125 g. of ethyl pivalylacetate. The mixture was boiled for 2½ hours, during which time ethanol and some xylene were removed by distillation. The mixture was then filtered into 4 liters of ligroin and cooled; the product thus obtained was recrystallized twice from alcohol to give coupler 4, M.P. 139–140° C.

Coupler 5.—A stirred solution of 25 g. of coupler 4 in 150 ml. of chloroform was cooled in an ice bath, and a solution of 6.48 g. of sulfuryl chloride in 25 ml. of chloroform was added over a period of ½ hour. The mixture was stirred at room temperature for ¾ hour, and the solvent was then removed under vacuum. The residue was recrystallized twice from hexane to give 21.3 g. of coupler 5, M.P. 101–103° C.

Coupler 6 was prepared by the reaction of 4.18 g. of methyl α-(α'-methoxyisobutyryl)-acetate and 10.0 g. of 5 - [α - (2,4 - di - tert - amylphenoxy) - acetamido] - 2-chloroaniline in 75 ml. of xylene, according to the procedure used for coupler 4 in Step 3. There was thus obtained 9.0 g. of product, which was recrystallized twice from a mixture of hexane and ethanol to give 5.79 g. of coupler 6, M.P. 106–109° C.

Coupler 7 was prepared by the reaction of 7.67 g. of 5 - [α - (2,4 - di - tert -amylphenoxy) - acetamide] - 2-chloroaniline and 3.46 g. of methyl α-(methoxypivalyl)-acetate in 50 ml. of xylene, in a manner similar to that described for coupler 4, Step 3. There was thus obtained, after one recrystallization from a mixture of hexane and ethanol, 7.72 g. of a white crystalline product, M.P. 108–110° C.

Coupler 8, prepared by the reaction of ethyl pivalylacetate with 5-[α-(2,4-di-tert-amylphenoxy)-acetamido]-2-chloroaniline according to a procedure similar to that used for coupler 4 in Step 3, was obtained as a white solid with a M.P. of 106–108° C.

Coupler 9 was prepared from ethyl pivalylacetate and 5 - [α' - (2,4 - di - tert - amylphenoxy) - butyramido] - 2-chloroaniline by a method similar to that described for coupler 4 in Step 3. The product was recrystallized from alcohol to give a white solid, M.P. 98.5–100° C.

Coupler 10 was prepared by the following steps:

Step 1.—γ-(2,4-di-tert-amylphenoxy)-4-chloro-3-nitrobutyranilide

To a stirred mixture of 107.5 g. of anhydrous sodium acetate, 96.0 g. of 4-chloro-3-nitroaniline, and 1500 ml. of glacial acetic acid was added 180 g. of γ-(2,4-di-tert-amylphenoxy)-butyryl chloride. The resulting mixture was stirred at room temperature for ¾ hour, permitted to stand overnight, and poured into 4500 ml. of water. The gummy product was separated, washed with water, and recrystallized twice from methanol to give yellow crystals, M.P. 86–91° C.

Step 2.—5-[γ-(2,4-di-tert-amylphenoxy)-butyramido]-2-chloroaniline

The reduction of γ-(2,4-di-tert-amylphenoxy)-4-chloro-3-nitrobutyranilide to 5 - [γ - (2,4-di-tert-amylphenoxy)-butyramido]-2-chloroaniline was accomplished in a manner similar to that described for coupler 4 in Step 2. From the hydrogenation of 47.5 g. of the starting nitro compound there was obtained, after two recrystallizations from cyclohexane, 36 g. of product, M.P. 113–115° C.

Step 3.—α-pivalyl-5-[γ-(2,4-di-tert-amylphenoxy)-butyramido]-2-chloroacetanilide The reaction of 5-[γ-(2,4-di-tert-amylphenoxy)-butyramido]-2-chloroaniline and ethyl pivalylacetate in xylene solution was carried out by a procedure similar to that described for coupler 4 in Step 3. The product was recrystallized from methanol to give coupler 10 as a white solid, M.P. 55–60° C.

Coupler 11 was prepared from 13.35 g. of 5-[γ-(2,4-di-tert-amylphenoxy) - butyramido]-2-chloroaniline and 5.78 g. of methyl α-(chloropivalyl)-acetate in 225 ml. of xylene by a procedure similar to that described for coupler 4 in Step 3. The crude product was recrystallized three times from hexane to give coupler 11, M.P. 95–99° C.

Coupler 12.—The reaction of methyl α-(α'methoxyisobutyryl)-acetate with 5 - [γ-(2,4-di-tert-amylphenoxy)-butyramido]-2-chloroaniline in xylene solution was carried out in a manner similar to that described for coupler 4 in Step 3. The crude product was recrystallized from a mixture of hexane and ethanol to give the coupler 12 as a white solid, M.P. 88–89° C.

Coupler 13.—Chlorine gas was passed through a suspension of 8.9 g. of 2-mercapto-5-phenyl-1,3,4-oxadiazole in 75 ml. of carbon tetrachloride until complete solution was attained. The solution was evaporated to dryness under vacuum and at room temperature, and the residue was dissolved in 700 ml. of toluene. To this solution was added 22.5 g. of coupler 10, and the mixture was heated at 75° C. for 4 hours, then concentrated under vacuum and at room temperature. The oily residue was extracted with methanol, and the extracts were concentrated to a residue which was then dissolved in acetic acid. Upon dilution of this solution with a large volume of water, the coupler was obtained as a gray-white solid, M.P. 110–112° C.

Coupler 14, prepared from equimolar quantities of ethyl pivalylacetate and 4-[N-(γ-phenylpropyl)-N-(p-tolyl)-carbamyl-methoxy]-aniline in a manner similar to that described for coupler 1, was obtained as a solid having a M.P. of 118–120° C.

Coupler 15, prepared from ethyl pivalylacetate and 4-[N-(γ-phenylpropyl) - N - (p-tolyl)-sulfamyl]-aniline by method similar to that used to prepare coupler 1, was obtained as a solid with a M.P. of 158–159° C.

Coupler 16.—The reaction of ethyl pivalylacetate with 5-p-toluene-sulfonamido-2-chloroaniline in boiling xylene by a procedure similar to that described for coupler 4 in Step 3 yielded a product which was recrystallized from alcohol to give the coupler M.P. 190–192.5° C.

Coupler 17.—The reaction of 2.0 g. of 2-(2',4'-di-tert-amylphenoxy) - 5 - (N-morpholinocarbonyl)-aniline and 1.7 g. of ethyl pivalylacetate in 15 ml. of xylene was carried out in a manner similar to that used for coupler 1. The product was recrystallized from methanol to give 1.5 g. of the coupler as white crystals, M.P. 178–180° C.

Coupler 18 was prepared by using the following steps:

Step 1.—α-pivalyl-3,5-dicarbomethoxyacetanilide

A mixture of 40 g. of 3,5-dicarbomethoxyaniline, 64 g. of ethyl pivalylacetate, 1 g. of anhydrous sodium acetate, and one liter of xylene was refluxed for 2 hours. The ethanol which formed was removed by distillation. The mixture was diluted with ligroin, concentrated by distillation, and cooled to yield 50 g. of product. Recrystallization of the product from a mixture of methanol and water yielded material having a M.P. of 110–112° C.

Step 2

To a saturated solution of chlorine in 250 ml. of carbon tetrachloride at a temperature of 0–5° C. was added 16.2 g. of bis-(3-octadecylcarbamylphenyl)-disulfide. The mixture was stirred at 25–35° for 1½ hours, then concentrated under vacuum to a yellow residue. This residue was dissolved in 400 ml. of carbon tetrachloride, and to the solution was added a slurry of 13.4 g. of α-pivalyl-3,5-dicarbomethoxyacetanilide in 100 ml. of carbon tetrachloride. The mixture was heated under reflux for 2½ hours, then cooled to room temperature. The crude product which separated was collected and recrystallized twice from carbon tetrachloride to give 16.8 g. of coupler 18, M.P. 120–121° C.

Coupler 19.—A slurry of 17 g. of α-pivalyl-3,5-dicarbomethoxyacetanilide in 200 ml. of alcohol was added to a solution of 7 g. of sodium hydroxide in 100 ml. of water. The mixture was heated at a temperature of 55–60° C. for 1 hour, then poured into 60 ml. of glacial acetic acid. The crude product obtained on cooling was separated and extracted with a mixture of alcohol and ether. The solid obtained by concentration of the extracts was dissolved in alcohol, and this solution was poured into a mixture of ice and acetic acid. The coupler was obtained as a white solid, M.P. 271.5–272.5° C. (dec.).

Coupler 20 was obtained by using the following steps:

Step 1.—α-Pivalyl-α-(3-tetradecylcarbamylphenylthio)-3,5-di-carbomethoxyacetanilide This compound was prepared from 11.0 g. of bis-(3-tetradecylcarbamylphenyl)-disulfide and 10.0 g. of α-pivalyl-3,5-dicarbomethoxyacetanilide by a method similar to that employed in the preparation of coupler 18. The crude product obtained was recrystallized from carbon tetrachloride to give 8.5 g. of a white solid, M.P. 134–135° C.

Step 2.—α-Pivalyl-α-(3-tetradecylcarbamylphenylthio)-3,5-di-carboxyacetanilide

A suspension of 4.25 g. of α-pivalyl-α-(3-tetradecylcarbamylphenylthio)-3,5-dicarbomethoxyacetanilide in 40 ml. of ethanol was treated with 4 ml. of 40% aqueous sodium hydroxide was stirred and heated on a steam bath for 15 minutes. Upon cooling, the mixture was diluted with ethanol and water, then filtered into diluted hydrochloric acid. There was obtained 3.5 g. of coupler M.P. 170–173° C.

Coupler 21.—The reaction of 6.27 g. of di-carbododecyloxyaniline and 2.06 g. of methyl pivalylacetate in 45 ml. of xylene in a manner similar to that described for coupler 4 Step 3, yielded a waxy solid, which was recrystallized several times from isopropyl alcohol to give 4.30 g. of coupler, M.P. 60–64° C.

Coupler 22 was prepared by using the following steps:

Step 1.—3,5-di-carbamylnitrobenzene

A mixture of 50 g. of 5-nitroisophthalic acid and 250 ml. of thionyl chloride was heated under reflux overnight. The mixture was concentrated under vacuum to a solid residue, which was extracted with anhydrous ether. The ethereal extract was added dropwise, with stirring, to a solution of anhydrous ammonia in 250 ml. of ether. The product separated from solution and was collected and dried; 28 g. of a colorless solid was obtained.

Step 2.—3,5-di-carbamylaniline

A solution of 20 g. of 3,5-di-carbamylnitrobenzene in absolute ethanol was hydrogenated at room temperature and an initial hydrogen pressure of 50 p.s.i. in the presence of palladium on charcoal catalyst. The catalyst was removed by filtration, and the filtrate was evaporated to yield 15.8 g. of a tan solid, M.P. 250–253° C. (dec).

Step 3.—α-Pivalyl-3,5-dicarbamylacetanilide

A solution of 8.0 g. of methyl pivalylacetate was added to a solution of 8.8 g. of 3,5-di-carbamylaniline in 500 ml. of xylene containing 0.5 g. of anhydrous sodium acetate. The resulting mixture was refluxed overnight; 10 ml. of distillate was collected during this time. Upon cooling, the coupler was obtained as a colorless solid, M.P. 241–243° C. (dec.).

Coupler 23.—3,5-di-(N-octylcarbamyl)-aniline was prepared by hydrogenation of the product of reaction between 5-nitroisophthaloyl chloride and n-octylamine; the procedure employed was similar to that used for coupler 22 in Steps 1 and 2. Reaction of ethyl pivalylacetate with 3,5-di-(N-octylcarbamyl)-aniline in xylene solution in a manner similar to that described for coupler 22 in Step 3, yielded coupler 23, M.P. 88–90° C.

Coupler 24 was obtained by using the following steps:

Step 1.—Alpha-pivalyl-4-chlorosulfonylacetanilide

To 350 ml. of chlorosulfonic acid 44 g. of coupler 1 was slowly added; the temperature was maintained below 8° by cooling. The mixture was stirred, with cooling, for 2 hours after addition was complete. After standing overnight the mixture was poured on ice, and the product which separated was extracted with ethyl acetate. The extracts were washed with water, dried and concentrated to dryness under vacuum to yield 31 g. of a pale yellow solid.

Step 2.—Alpha-pivalyl-4-sulfoacetanilide potassium salt

A solution of one part alpha-pivalyl-4-chlorosulfonyl in 10 parts of methanol was refluxed for 3½ hours, then filtered and concentrated under vacuum to dryness. The residue was dissolved in water and treated with a saturated aqueous solution of potassium acetate. The solid which separated was recrystallized to give coupler 24 as a white solid which decomposed without melting at 270° C.

Coupler 25.—Alpha-pivalyl-alpha-(3-octadecylcarbamylphenylthio)-4-chlorosulfonylacetanilide was prepared, according to a procedure similar to that described for coupler 18, from 40 g. of bis(3-octadecylcarbamylphenyl)-disulfide and 31 g. of alpha-pivalyl-4-chlorosulfonylacetanilide (prepared as indicated for coupler 24 in Step 1). The crude product was dissolved in 700 ml. of methanol, and the mixture was refluxed for 3½ hours, then filtered, concentrated to one-half its original volume, and treated with 10 g. of potassium acetate. The solid material which separated was recrystallized from methanol to give coupler 25 as a white solid.

Coupler 26 may be prepared by the following steps:

Step 1.—Alpha-(alpha',alpha'-dimethylstearoyl) acetanilide

Reaction of methyl alpha-(alpha',alpha'-dimethylstearoyl)acetate with aniline in a manner similar to that used to prepare coupler 1 would yield alpha-(alpha',alpha'-dimethylstearoyl)acetanilide.

Step 2.—Alpha-(alpha',alpha'-dimethylstearoyl)-4-chlorosulfonylacetanilide

Treatment of alpha-(alpha',alpha'-dimethylstearoyl)-acetanilide according to a procedure similar to that described for coupler 24 in Step 1, would yield alpha-(alpha',alpha'-dimethylstearoyl)-4-chlorosulfonylacetanilide.

Step 3.—Alpha-(alpha',alpha'-dimethylstearoyl)-4-sulfoacetanilide potassium salt Treatment of the chlorosulfonated coupler prepared in Step 2 with methanol and potassium acetate in a manner similar to that described for coupler 25 would yield coupler 26.

Coupler 27 may be prepared from methyl alpha-(alpha',alpha'-di-n-amyl)heptanoylacetate and 5-heptanamido-2-fluoraniline by a procedure similar to that described for coupler 4 in Step 3.

Coupler 28 was prepared by the followings steps:

Step 1.—Ethyl-7,7-dimethynorbornane-1-carboxylate

A mixture of 15 g. of 7,7-dimethylnorbornane-1-carboxylic acid (prepared by the method of D. N. Kursanov and S. V. Vitt, Zhur, Obschei Khim., 25, 2509 (1955) and 25 ml. of thionyl chloride was refluxed for 30 minutes. After removal of excess thionyl chloride by distillation under vacuum, a solution of 10 ml. of absolute ethanol in 50 ml. of dry ether was added. The resulting mixture was refluxed for 15 minutes, then cooled, washed with water, dried over magnesium sulfate, and distilled to give 11 g. of a colorless liquid, B.P. 103–104° C. (18 mm.).

Step 2.—7,7-dimethyl-1-cyanoacetylnorbornane

A solution of 4.1 g. of acetonitrile in 15 ml. of ether was added to a suspension of sodamide (prepared from 2.3 g. of sodium metal) in 200 ml. of liquid ammonia. After 5 minutes of solution of 9.8 g. of ethyl 7,7-dimethylnorbornane-1-carboxylate in 15 ml. of ether was added, and, after 30 minutes, 200 ml. of ether was added. The mixture was warmed to drive off excess ammonia, then poured into 500 ml. of water. The aqueous phase was separated, acidified with acetic acid, and extracted with ether. The extracts were concentrated, and the residue was recrystallized from a mixture of ether and petroleum ether to give a white solid, M.P. 58–60° C.

Step 3.—Methyl alpha-(7,7-dimethylnorbornane-1-carbonyl)-acetate

A solution of 6.0 g. of 7,7-dimethyl-1-(cyanoacetylnorbornane in 50 ml. of dry methanol was saturated with hydrogen chloride gas and permitted to stand at room temperature for 15 hours. The mixture was concentrated to dryness under vacuum, and the residue was treated with 35 ml. of benzene and 35 ml. of water. The mixture was refluxed for 2 hours; then the organic layer was separated, washed with water, and distilled to yield 3.6 g. of a colorless oil, B.P. 101–105° C. (0.3 mm.).

Step 4.—Alpha-(7,7-dimethylnorbornane-1-carbonyl)-3′,5′-dicarbomethoxyacetanilide The reaction of 3.4 g. of methyl alpha-(7,7-dimethylnorbornane-1-carbonyl)acetate with 3.1 of 3,5-dicarbomethoxy aniline in 80 ml. of xylene containing 0.1 g. of sodium acetate was carried out in a manner similar to that described for coupler 18. The product obtained was recrystallized first from ethanol and then from acetonitrile to give 4.5 g. of a white solid with a M.P. of 156–158° C.

Step 5.—Alpha-(7,7-dimethylnorbornane - 1 - carbonyl)-alpha-(3-octadecylcarbamylphenylthio)-3′,5′ - dicarbomethoxy-acetanilide The preparation of this compound from 4.0 g. of alpha-(7,7-dimethylnorbornane - 1 - carbonyl)-3′,5′-dicarbomethoxyacetanilide and 4.05 g. of bis(3-octadecylcarbamylphenyl)disulfide was carried out by a procedure similar to that used to prepare coupler 18. The product was recrystallized from carbon tetrachloride to give 5.1 g. of a white solid, M.P. 129–131° C.

Step 6.—Alpha-(7,7-dimethylnorbornane - 1 - carbonyl) alpha-(3-octadecylcarbamylphenylthio) - 3′,5′ - dicarboxyacetanilide A mixture of 4.1 g. of alpha-(7,7-dimethylnorbornane-1-carbonyl) - alpha - (3 - octadecylcarbamylphenylthio)-3′,5′-dicarbomethoxyacetanilide, 60 ml. of alcohol, and 8.4 ml. of 2N aqueous sodium hydroxide was heated at 45–50° C. for 45 minutes, then filtered. The filtrate was acidified with hydrochloric acid, and the material which separated was recrystallized from glacial acetic acid to give 2.5 g. of coupler 28, M.P. 126–129° C.

Coupler 29.—The reaction of equimolar quantities of methyl alpha-(7,7 - dimethylnorbornane - 1 - carbonyl)-acetate (prepared as indicated for coupler 28 in steps 1, 2 and 3) and 5-[γ-(2,4 - di - tert. - amylphenoxy)butyramido]-2-chloroaniline (prepared as indicated for coupler 10 in steps 1 and 2) was carried out by a procedure similar to that described in step 3 for coupler 4. The product was recrystallized several times from methanol to give coupler 29 as a white crystalline solid, M.P. 99–101° C.

Coupler 30.—The reaction of 13.35 g. of 5-[γ-(2,4-di-tert.-amylphenoxy)-butyramido]-2-chloroaniline and 6.53 g. of methyl-1-methylcyclohexane - 1 - carbonylacetate in 100 ml. of xylene was carried out in a manner similar to that described for coupler 4 in step 3. The product was recrystallized several times from a mixture of hexane and ethyl acetate to give 10.5 g. of coupler 30, M.P. 113–116° C.

Coupler 31 was prepared by the following steps:

Step 1.—2,5-dichloro-4-(chlorosulfonyl)acetanilide

To 3 liters of chlorosulfonic acid was added 300 g. of 3,5-dichlorosulfanilic acid sodium salt with stirring to a temperature between 45 and 50° C. The clear reaction mixture was stirred for one hour at room temperature. After the addition of sulfanilic acid had been completed, the mixture was heated on a steam bath overnight. The clear solution was then added dropwise to crushed ice and the white solid which separated was collected, dried, and recrystallized from benzene cyclohexane mixture, yielding 165 g. of product, M.P. 149–151° C.

Step 2.—2,5-dichloro-4-[N′-(n-octadecyl)-N′-methylsulfamyl]acetanilide

To a solution of 440 g. of N-methyl-N-octadecylamine in 4 liters of dry pyridine at a temperature of 35° C. was added 470 g. of the product of step 1. The mixture was heated to 60° to bring about complete solution, then stirred at room temperature for one hour, after which time it was drowned in 40 liters of saturated brine. The solid which separated was collected and recrystallized from methanol, yielding 520 g. of product, M.P. 74–76° C.

Step 3.—2,5-dichloro-4-[N′-(n-octadecyl)-N′-methylsulfamyl]aniline

To a solution of 388 g. of the product of step 2 in 5 liters of absolute alcohol was added an aqueous solution of 100 g. of sodium hydroxide in 200 ml. of water. The resultant clear solution was refluxed for ½ hour, after which time it was cooled under tap water, whereupon a white solid separated. The mixture was diluted with an equal volume of cold distilled water and left at room temperature overnight. The solid was collected and recrystallized from 16 liters of methanol, yielding 253 g. of product, M.P. 84–85° C.

Step 4.—Coupler 31

A solution of 250 g. of the product of step 3, 78 g. of methyl α-pivalyl acetate, and 0.25 g. of anhydrous sodium acetate in 900 ml. of dry xylene was refluxed for 5 hours, during which time methanol distilled from the mixture. The clear reaction mixture was concentrated in vacuo and the residual glass was then recrystallized from methanol, yielding 14.3 g. of product, M.P. 63–65° C.

Coupler 32 was prepared by the same reactions used to make Coupler 31 except that in step 1, an equivalent amount of 2-chlorosulfanilic acid sodium salt was used in place of 3,5-dichlorosulfanilic acid sodium salt. The recrystallized coupler had a M.P. of 75–75.5° C.

Coupler 33 was prepared by the same reactions used to make Coupler 31 except that in step 1 an equivalent amount of 2-chlorosulfanilic acid sodium salt was used in place of 3,5-dichlorosulfanilic acid sodium salt and in step 2 an equivalent amount of N-phenyl-N-octadecylamine was used in place of N-methyl-N-octadecylamine. The recrystallized coupler had a M.P. of 95–97.5° C.

Coupler 34 was prepared by the same reactions used to make Coupler 31 excepting that step 1 an equivalent amount of 2-chlorosulfanilic acid sodium salt was used in place of 3,5-dichlorosulfanilic acid sodium salt, and in step 2 an equivalent amount of N-benzyl-N-(1-methyldodecyl)amine was used in place of N-methyl-N-octadecylamine. The recrystallized Coupler 34 had a M.P. of 80–81° C.

Coupler 35 was prepared by the same reactions used to make Coupler 31 except that in step 2 an equivalent amount of N-phenyl-N-octadecylamine was used in place of N-methyl-N-octadecylamine. The recrystallized coupler had a M.P. of 70–71° C.

Coupler 36 was prepared by the same reactions used to make Coupler 31 except that in step 2 an equivalent amount of N-benzyl-N-(1-methyldodecyl)amine was used in place of N-methyl-N-octadecylamine.

Coupler 37 was prepared by the same reactions used to make Coupler 10 except that in step 3 an equivalent amount of ethyl α-(α,α-diphenylbutyryl)acetate was used in place of ethyl pivalylacetate. The recrystallized coupler obtained had a M.P. of 149–155° C.

Coupler 38 was prepared by the same reactions used to make Coupler 10 except that in step 3 an equivalent amount of ethyl α-(α-methyl-α-phenyl)propionyl acetate was substituted for ethyl ivalylacetate. The recrystallized coupler obtained had an M.P. of 96–98° C.

Coupler 39 may be prepared according to a procedure similar to that described for Coupler 18 but from bis-(3-octadecylcarbamylphenyl)-disulfide and α-(α-phenylisobutyryl)-4-chlorosulfonylacetanilide and subsequently forming the potassium salt monohydrate by refluxing a methanol solution of the crude product, filtering, concentrating the filtrate to one-half its original volume and treating with potassium acetate as described for Coupler 25. The α-(α-phenylisobutyryl)-4-chlorosulfonylacetanilide may be prepared by the reaction used to make Coupler 1 but using ethyl α-(α-phenylisobutyryl)acetate in place of ethyl pivalylacetate, and then treating the product with chlorosulfonic acid as described in the preparation of Coupler 24.

Coupler 40 may be prepared by reacting 3,5-dicarbomethoxyaniline with α-(α-phenylisobutyryl)acetate, followed by reaction with bis-(3-octadecylcarbamylphenyl)-disulfide, then subsequently hydrolyzing the product with aqueous sodium hydroxide, followed by acidification.

Coupler 41, a mixture of 40 g. of methyl α-pivalylacetate and 47 g. of diethylimino acetate in 200 ml. of xylene was refluxed for 1½ hours, during which time methanol distilled from the mixture. The resultant solution was then concentrated in vacuo and the residual oil was distilled (B.P. 146–149° C. at 0.1 ml.), yielding 59 g. of the coupler.

Coupler 42, a mixture of 20 g. of 2-aminothiazol and 33 g. of methyl α-pivalylacetate in 200 ml. of xylene was refluxed for 2¼ hours, during which time methanol distilled from the mixture. The reaction mixture was left at room temperature for 3 days, after which time the solid which had separated was collected and recrystallized from a mixture of hexane and ethyl acetate, yielding 76 g. of product, M.P. 139–143° C.

Coupler 43 may be prepared by a method similar to that used for Coupler 20 excepting that dioctadecyl disulfide was used in place of bis-(3-tetradecylcarbamylphenyl)disulfide.

Coupler 44 may be prepared by reacting Coupler 41 with bis-(3-octadecylcarbamylphenyl)-disulfide, followed by alkaline hydrolysis, and finally acidification.

Coupler 45 is prepared by the reactions used to prepare Coupler 42 but substituting 2-amino-4,5-dicarbethoxythiazol for 2-aminothiazol.

Coupler 46, to a suspension of 64 g. of α-pivalyl-4-chlorosulfonyl acetanilide (prepared in Step 1 of the synthesis of Coupler 24) in 500 ml. of dry dioxane at 10° C. was added, with stirring, a solution of 12 g. of 1,6-hexanediamine and 61 g. of triethylamine over a period of one hour. The reaction mixture was stirred for an additional 30 minutes at 10° C., after which time the temperature of the mixture was raised to 25° C. over a two hour period. The mixture was heated, stirred at 90° C. for two more hours, concentrated in vacuo to dryness, and the residue dissolved in 400 ml. of ethyl acetate. This solution was washed twice with 500 ml. portions of water, dried over magnesium sulfate, and concentrated to dryness. The residue was recrystallized twice from methyl alcohol, yielding the product, M.P. 98–100° C.

Our couplers are especially adapted for incorporation in light sensitive emulsion of the developing-out type. They can be incorporated in photographic emulsions with any of the well-known coupler solvents, sometimes also known as porosity modifiers or high boiling crystalloidal materials or oil formers of Mannes et al. U.S. Patent 2,304,939 and 2,304,340, and Jelley et al. U.S. Patent 2,322,027. Coupler solvent β-(p-tert.-butylphenoxy)ethyl alcohol of Jelley, 2,4-di-tert.-amylphenoxyethanol, and other mono-, di-, or trialkylphenoxy alcohols can be used to advantage with the couplers of our invention or with any coupler that is used or can be used with our emulsions.

Various surfactants can be used as dispersing agents in preparing coupler dispersions in gelatin for making photographic emulsions. The propylated naphthalenesulfonates such as Alkanol B. Antaron R–275, Nekal BX–78 and Aerosol OS; the sodium alkyl benzenesulfonates such as Sul-fon-ate AA–10, and Nacconol FSNO; sodium lauryl sulfate such as Tridupone 51–a; and the N - (carbo-p-tert.-octylphenoxypentethoxy)glutamate such as Triglutol-5 may be used as dispersing agents for our couplers or for any coupler that is used in emulsions that are used in photographic products with our emulsions.

The emulsions can be chemically sensitized by any of the accepted procedures. The emulsions can be digested with naturally active gelatin, or sulfur compounds can be added such as those described in Sheppard U.S. Patent 1,574,944, issued Mar. 2, 1926, Sheppard et al. U.S. Patent 1,623,499 issued Apr. 5, 1927, and Sheppard et al. U.S. Patent 2,410,689, issued Nov. 5, 1946.

The emulsions can also be treated with salts of the noble metals such as ruthenium, rhodium, palladium, iridium, and platinum. Representative compounds are ammonium chloropalladate, potassium chloroplatinate, and sodium chloropalladite, which are used for sensitizing in amounts below that which produces any substantial fog inhibition, as described in Smith and Trivelli U.S. Patent 2,448,060, issued Aug. 31, 1948, and as antifoggants in higher amounts, as described in Trivelli and Smith U.S. Patents 2,566,245, issued Aug. 28, 1951 and 2,566,263, issued Aug. 28, 1951.

The emulsions can also be chemically sensitized with gold salts as described in Waller et al. U.S. Patent 2,399,-083, issued Apr. 23, 1946, and Damschroder et al. U.S. Patent 2,642,361, issued June 16, 1953. Suitable compounds are potassium chloroaurite, potassium aurithiocyanate, potassium chloroaurate, auric trichloride and 2-aurosulfobenzothiazole methochloride.

The emulsions can also be chemically sensitized with reducing agents such as stannous salts (Carroll U.S. Patent 2,487,850, issued Nov. 15, 1949), polyamines, such as diethyl triamine (Lowe and Jones U.S. Patent 2,518,698, issued Aug. 15, 1950), polyamines, such as spermine (Lowe and Allen U.S. Patent 2,521,925, issued Sept. 12, 1959), or bis(β-aminoethyl)sulfide and its water-soluble salts (Lowe and Jones U.S. Patent 2,521,926, issued Sept. 12, 1950).

The emulsions can also be optically sensitized with cyanine and merocyanine dyes, such as those described in Brooker U.S. Patents 1,846,301, issued Feb. 23, 1932; 1,846,302, issued Feb. 23, 1932; and 1,942,854, issued Jan. 9, 1934; White U.S. Patent 1,990,507, issued Feb. 12, 1935; Brooker and White U.S. Patents 2,112,140, issued Mar. 22, 1938; 2,165,338, issued July 11, 1939; 2,493,-747, issued Jan. 10, 1950 and 2,739,964, issued Mar. 27, 1956; Brooker and Keyes U.S. Patent 2,493,748, issued Jan. 10, 1950; Sprague U.S. Patents 2,503,776, issued Apr. 11, 1950 and 2,519,001, issued Aug. 15, 1950; Heseltine and Brooker U.S. Patent 2,666,761, issued Jan. 19, 1954; Heseltine U.S. Patent 2,734,900, issued Feb. 14, 1956; Van Lare U.S. Patent 2,739,149, issued Mar. 20, 1956; and Kodak Limited British patent 450,958, accepted July 15, 1936.

The emulsions can also be stabilized with the mercury compounds of Allen, Byers and Murray U.S. Patent 2,728,-663, issued Dec. 27, 1955; Carroll and Murray U.S. Patent 2,728,664, issued Dec. 27, 1955; and Leubner and Murray U.S. Patent 2,728,665, issued Dec. 27, 1955; or with gold salts as described in Damschroder U.S. Patent 2,597,856, issued May 27, 1952, and Yutzy and Leermakers U.S. Patent 2,597,915, issued May 27, 1952; the triazoles of Heimbach and Kelly U.S. Patent 2,444,608, issued July 6, 1943; the azaindenes of Heimbach and Kelly U.S. Patents 2,444,605 and 2,444,606, issued July 6, 1948; Heimbach U.S. Patents 2,444,607, issued July 6, 1948 and 2,450,397, issued Sept. 28, 1948; Heimbach and Clark U.S. Patent 2,444,609, issued July 6, 1948; Allen and Reynolds U.S. Patents 2,713,541, issued July 19, 1955 and 2,743,181, issued Apr. 24, 1956; Carroll and Beach U.S. Patent 2,716,062, issued Aug. 23, 1955; Allen and Beilfuss U.S. Patent 2,735,769, issued Feb. 21, 1956; Reynolds and Sagal U.S. Patent 2,756,147, issued July 24, 1956; Allen and Sagura U.S. Patent 2,772,164, issued Nov. 27, 1956; and those disclosed by Birr in "Z. wiss. Phot.", vol. 47, 1952, p. 2–28; the disulfides of Kodak Belgian Patent 569,317, issued July 31, 1958; the quaternary benzothiazolium compounds of Brooker and Staud U.S. Patent 2,131,038, issued Sept. 27, 1938 or the polymethylene bisbenzothiazolium salts of Allen and Wilson U.S. Patent 2,694,716, issued Nov. 16, 1954 (e.g., decamethylene-bisbenzothiazolium perchlorate); or the zinc and cadmium salts of Jones U.S. Patent 2,839,405, issued June 17, 1958; and the carboxymethylmercapto compounds of Murray, Reynolds and VanAllan U.S. Patent 2,819,965, issued Jan. 14, 1958.

The emulsions may also contain speed increasing compounds of the quaternary ammonium type of Carroll U.S. Patent 2,271,623, issued Feb. 3, 1942; Carroll and Allen U.S. Patent 2,288,226, issued June 30, 1942; and Carroll and Spence U.S. Patent 2,334,864, issued Nov. 23, 1943; or the quaternary ammonium salts and polyethylene glycols of Piper U.S. Patent 2,886,437, issued May 12, 1959; and the polyethylene glycol type of Carroll and Beach U.S. Patent 2,708,162, issued May 10, 1955; or the thiopolymers of Graham and Sagal U.S. application Ser. No. 779,839, filed Dec. 12, 1958, now U.S. Patent 3,046,-129, or Dann and Chechak U.S. application Ser. No. 779,874, filed Dec. 12, 1958, now U.S. patent 3,046,134.

The emulsions may contain a suitable gelatin plasticizer such as glycerin; a dihydroxy alkane such as 1,5-pentane diol as described in Milton and Murray U.S. application Ser. No. 588,951, filed June 4, 1956, now U.S. Patent 2,960,404, issued Nov. 15, 1960; an ester of an ethylene bis-glycolic acid such as ethylene bis(methyl glycolate) as described in Milton U.S. application Ser. No. 662,564, filed May 31, 1957, now U.S. Patent 2,904,-434, issued Sept. 15, 1959; bis(ethoxy diethylene glycol) succinate as described in Gray U.S. application Ser. No. 604,333, filed Aug. 16, 1956, now U.S. Patent 2,940,854, issued June 14, 1960; or a polymeric hydrosol as results from the emulsion polymerization of a mixture of an amide of an acid of the acrylic acid series, an acrylic acid ester and a styrene-type compound as described in Tong U.S. Patent 2,852,386, issued Sept. 16, 1958. The plasticizer may be added to the emulsion before or after the addition of a sensitizing dye, if used.

The emulsions may be hardened with any suitable hardener for gelatin such as formaldehyde; a halogen-substituted aliphatic acid such as mucobromic acid as described in White U.S. Patent 2,080,019, issued May 11, 1937; a compound having a plurality of acid anhydride groups such as 7,8-diphenylbicyclo-(2,2,2)-octene-2,3,5,6-tetra-carboxylic dianhydride, or a dicarboxylic or a disulfonic acid chloride such as terephthaloyl chloride or naphthalene-1,5-disulfonyl chloride as described in Allen and Carroll U.S. Patents 2,725,294 and 2,725,295, both issued Nov. 29, 1955; a cyclic 1,2-diketone such as cyclopentane-1,2-dione as described in Allen and Byers U.S. Patent 2,725,305, issued Nov. 29, 1955; a bisester of methanesulfonic acid such as 1,2-di(methanesulfonoxy) ethane as described in Allen and Laakso U.S. Patent 2,726,162, issued Dec. 6, 1955; 1,3-dihydroxymethylbenzimidazol-2-one as described in July, Knott and Pollak U.S. Patent 2,732,316, issued Jan. 24, 1956; a dialdehyde or a sodium bisulfite derivative thereof, the aldehyde groups of which are separated by 2–3 carbon atoms, such as $\beta$-methyl gluataraldehyde bis-sodium bisulfite as described in Allen and Burness, U.S. patent application Ser. No. 556,031, filed Dec. 29, 1955, abandoned Apr. 21, 1960; a bis-aziridine carboxamide such as trimethylene bis(1-aziridine carboxamide) as described in Allen and Webster U.S. patent application Ser. No. 599,891, filed July 25, 1956, now U.S. Patent 2,950,197, issued Aug. 23, 1960; or 1,3-di-hydroxy dioxane as described in Jeffreys U.S. Patent 2,870,013, issued Jan. 20, 1959; or bisisocyanate as described in Henn et al. U.S. patent application Ser. No. 805,357, filed Apr. 10, 1959, now U.S. Patent 3,103,437.

The emulsions may contain a coating aid such as saponin; a lauryl or oleyl monoether of polyethylene glycol as described in Knox and Davis U.S. Patent 2,831,766, issued Apr. 22, 1958; a salt of a sulfated and alkylated polyethylene glycol ether as described in Knox and Davis U.S. Patent 2,719,087, issued Sept. 27, 1955; an acylated alkyl taurine such as the sodium salt of N-oleyl-N-methyl taurine as described in Knox, Twardokus and Davis U.S. Patent 2,739,891, issued Mar. 27, 1956; the reaction product of a dianhydride of tetracarboxybutane with an alcohol or an aliphatic amine containing from 8 to 18 carbon atoms which is treated with a base, for example, the sodium salt of the monoester of tetracarboxybutane as described in Knox, Stenberg and Wilson U.S. Patent 2,843,-487, issued July 15, 1958; a water-soluble maleopimarate or a mixture of a water-soluble maleopimarate and a substituted glutamate salt as described in Knox and Fowler U.S. Patent 2,823,123, issued Feb. 11, 1958; an alkali metal salt of a substituted amino acid such as disodium N-(carbo-p-tert-octylphenoxypentaethoxy) - glutamate as described in Knox and Wilson U.S. patent application Ser. No. 600,679, filed July 30, 1956, now U.S. Patent 3,038,804; or a sulfosuccinamate such as tetrasodium N-(1,2-dicarboxyethyl)-N-octadecyl sulfosuccinamate or N-lauryl disodium sulfosuccinamate as described in Knox and Stenberg U.S. patent application Ser. No. 691,125, filed Oct. 21, 1957, now U.S. Patent 2,992,108, issued July 11, 1961; or a sodium salt of an alkylarylpolyether sulfonate of U.S. patent application Ser. No. 753,642, filed Aug. 7, 1958, now U.S. Patent 3,026,202, issued Mar. 20, 1962.

The couplers which we have described may be used in various kinds of photographic emulsions. They may be added to the emulsion before or after any sensitizing dyes which are used. Various silver salts may be used as the sensitive salt, such as, silver bromide, silver iodide, silver chloride, or mixed silver halides such as silver chlorobromide or silver bromoiodide. The couplers are used in emulsions intended for color photography, for example, emulsions containing color-forming couplers of emulsions to be developed by solutions containing couplers or other color-generating materials, emulsions of the mixed-packet type, such as described in Godowsky U.S. Patent 2,698,794, issued Jan. 4, 1955; or emulsions of the mixed-grain type, such as described in Carroll and Hanson U.S. Patent 2,592,243, issued Apr. 8, 1952. The couplers can also be used in emulsions which form latent images predominantly on the surface of the silver halide crystal or in emulsions which form latent images predominantly inside the silver halide crystal, such as those described in Davey and Knott U.S. Patent 2,592,250, issued Apr. 8, 1952.

The couplers may also be used in emulsions intended for use in diffusion transfer processes which utilize the undeveloped silver halide in the nonimage areas of the negative to form a positive by dissolving the undeveloped silver halide and precipitating it on a receiving layer in close proximity to the original silver halide emulsion layer. Such processes are described in Rott U.S. Patent 2,352,014, issued June 20, 1944, and Land U.S. Patents 2,584,029, issued Jan. 29, 1952; 2,698,236, issued Dec. 28, 1954 and 2,543,181, issued Feb. 27, 1951; and Yackel et al. U.S. patent application Ser. No. 586,705, filed May 23, 1956, now U.S. Patent 3,020,155, issued Feb. 6, 1962. They may also be used in color transfer processes which utilize the diffusion transfer of an imagewise distribution of developer, coupler or dye, from a light-sensitive layer to a second layer, while the two layers are in close proximity to one another. Color processes of this type are described in Land U.S. Patents 2,559,643, issued July 10, 1951 and 2,698,798, issued Jan. 4, 1955; Land and Rogers Belgian Patents 554,933 and 554,934, granted Aug. 12, 1957; International Polaroid Belgian Patents 554,212, granted July 16, 1957 and 554,935, granted Aug. 12, 1957; Yutzy U.S. Patent 2,756,142, granted July 24, 1956 and Whitmore and Mader U.S. patent application Ser. No. 734,141, filed May 9, 1958, now abandoned. They may also be used in emulsions intended for use in a monobath process such as described in Haist et al. U.S. Patent 2,875,048, issued Feb. 24, 1959, and in web-type processes, such as the one described in Tregillus et al. U.S. patent application Ser. No. 835,473, filed Aug. 24, 1959, now U.S. Patent 3,179,517.

In the preparation of the silver halide dispersions employed for preparing silver halide emulsions, there may be employed as the dispersing agent for the silver halide in its preparation, gelatin or some other colloidal material such as colloidal albumin, a cellulose derivative, or a synthetic resin, for instance, a polyvinyl compound. Some colloids which may be used are polyvinyl alcohol or a hydrolyzed polyvinyl acetate as described in Lowe U.S. Patent 2,286,215, issued June 16, 1942; a far hydrolyzed cellulose ester such as cellulose acetate hydrolyzed to an acetyl content of 19–26% as described in U.S. Patent 2,327,808 of Lowe and Clark, issued Aug. 24, 1943; a water-soluble ethanolamine cellulose acetate as described in Yutzy U.S. Patent 2,322,085, issued June 15, 1943; a polyacrylamide or an imidized polyacrylamide as described in Lowe, Minsk and Kenyon U.S. Patent 2,541,-474, issued Feb. 13, 1951; zein as described in Lowe U.S. Patent 2,563,791, issued Aug. 7, 1951; a vinyl alcohol polymer containing urethane carboxylic acid groups of the type described in Unruh and Smith U.S. Patent 2,768,-154, issued Oct. 23, 1956; or containing cyano-acetyl groups such as the vinyl alcohol-vinyl cyanoacetate copolymer as described in Unruh, Smith and Priest, U.S. Patent 2,808,331, issued Oct. 1, 1957; or a polymeric material which results from polymerizing a protein or a saturated acylated protein with a monomer having a vinyl group as described in U.S. Patent 2,852,382, of Illingsworth, Dann and Gates, issued Sept. 16, 1958.

If desired, compatible mixtures of two or more of these colloids may be employed for dispersing the silver halide in its preparation. Combinations of these antifoggants, sensitizers, hardeners, etc., may be used.

Photographic emulsions containing our couplers are color developed by developer solutions containing any of the well known primary aromatic amino silver halide developing agents such as the phenylene diamines including the alkylphenylenediamines and the alkyltoluenediamines. These are generally used in the salt form such as the hydrochloride or sulfate. The p-aminophenols and their substitution products may also be used where the amino group is substituted. All of the developing agents have an unsubstituted amino group which enables the oxidation product of the developer to couple with the color forming coupler compounds to form a dye image.

Typical developers containing these developing agents are as follows:

Developer 1

| | | |
|---|---|---|
| 2-amino-5-diethylaminotoluene hydrochloride | grams | 2.5 |
| Sodium sulfite (anhydrous) | do | 5.0 |
| Sodium carbonate (anhydrous) | do | 20.0 |
| Potassium bromide | do | 2.0 |
| Water to | liter | 1.0 |

Developer 2

| | | |
|---|---|---|
| N - ethyl - β - methanesulfonamidoethyl - 3 - methyl-4-aminoaniline sulfate | grams | 2.0 |
| Sodium sulfite (anhydrous) | do | 0.6 |
| Sodium carbonate (anhydrous) | do | 30.0 |
| Water to | liter | 1.0 |

The couplers of our invention such as couplers 18, 20, 25 and 28 are capable of reacting with oxidized color developer to form a diffusible dye and are therefore useful in the color diffusion transfer processes such as disclosed in Whitmore et al. Ser. No. 734,141, May 9, 1958, now abandoned, Williams et al. Ser. No. 780,710, Dec. 16, 1958, now abandoned. Accordingly, the emulsions having these couplers in contiguity can be exposed and developed to form a diffusible dye image in the region of development which dye image transfers by diffusion to a reception layer.

Our invention is further illustrated by the following specific examples showing how our couplers are incorporated in photographic emulsions and then used to produce yellow dye images having valuable light absorption characteristics for color photography.

EXAMPLE I 25 ml. of a dispersion of 1 g. of coupler 10 and 0.5 g. of di-n-butylphthalate coupler solvent in 2.2 g. of gelatin was mixed with 5 ml. of a conventional-medium speed silver bromoiodide emulsion and the mixture was coated on a suitably-subbed cellulose acetate support. After being dried, the coating was exposed under an image and developed in Developer 2 to form a negative silver and yellow dye image. The silver image and the residual silver halide were removed by treatment with a conventional ferricyanide bleach followed by a hypo fixing bath leaving a yellow negative image having a λmax (i.e. maximum absorption) at a wavelength of 444 mμ, and exhibiting particularly good absorption characteristics.

EXAMPLE II

Another film sample coated with the above emulsion was exposed and given the same processing, but with Developer 1. The yellow dye image produced also had very desirable absorption characteristics and a λmax value of 448 mμ.

EXAMPLE III

An emulsion coating was made as in Example I but in which 1 g. of coupler 2 and 2 g. of di-n-butylphthalate was incorporated instead of coupler 10. This was exposed and developed with Developer 1. The dye image produced had a maximum absorption at 444 mμ and the absorption characteristics shown as Curve D of FIGURE 2 of the accompanying drawing.

EXAMPLE IV

An emulsion coating was made as in Example I but using 1 g. of coupler 9 and 0.25 g. of di-n-butylphthalate in place of coupler 10. This was exposed and developed in Developer 2. After removal of the silver and residual silver halide by conventional bleaching and fixing, a yellow dye image having a λmax value of 444 mμ was produced.

EXAMPLE V

An emulsion coating was made as in Example I but using coupler 6 in place of coupler 10. This was exposed and processed as in Example I to produce a good yellow dye image having a λmax value of 438 mμ.

EXAMPLE VI

Another film sample coated with the emulsion of Example V was given the same processing but with Developer 1. This produced a good yellow dye image having a λmax value of 442 mμ.

EXAMPLE VII

Similarly, other couplers of our invention were incorporated in emulsion layers, exposed to an image and developed to produce yellow dye images having valuable characteristics for use in color photography.

The following table lists λmax values for the dyes produced from representative couplers of our invention.

TABLE C

| Coupler | Ratio of coupler to di-n-butyl-phthalate | Max. value in mμ of dye produced in silver halide emulsion layer containing coupler by color development with— | |
|---|---|---|---|
| | | Developer 1 | Developer 2 |
| 1 | 1:2 | 432 | 436 |
| 2 | 1:2 | 444 | ---------- |
| 3 | 1:2 | 440 | ---------- |
| 4 | 1:½ | 448 | 444 |
| 5 | 1:2 | 448 | 442 |
| 6 | 1:½ | 442 | 438 |
| 7 | 1:½ | 444 | 440 |
| 8 | 1:2 | 438 | ---------- |
| 9 | 1:¼ | 446 | 444 |
| 10 | 1:½ | 448 | 444 |
| 11 | 1:½ | 458 | 454 |
| 15 | 1:½ | 455 | 448 |
| 16 | 1:2 | 448 | ---------- |
| 17 | 1:2 | 446 | ---------- |
| 21 | 1:½ | 444 | 442 |
| 22 | 1:2 | 448 | 448 |
| 23 | 1:½ | 444 | 444 |
| 27 | 1:½ | 455 | 454 |
| 31 | 1:½ | 462 | 458 |
| 32 | 1:½ | 456 | 452 |
| 33 | 1:½ | 458 | 454 |
| 34 | 1:½ | 457 | 453 |
| 35 | 1:½ | 462 | 459 |
| 36 | 1:½ | 464 | 458 |
| 37 | 1:½ | 458 | 453 |
| 38 | 1:½ | 452 | 450 |

Table D lists λmax values for dyes produced by the color development of exposed photographic elments containing mordanted couplers of the type used for image transfer processes. These dyes were produced by development with a developer solution of the type of Developer 2 but in which 4-N-ethyl-N-β-hydroxyethylamino aniline was used as the developing agent in place of N-ethyl-λ-methanesulfonamido-3-methyl-4-amino aniline sulfate.

TABLE D

| Coupler | $\lambda_{max}$, of dye in mμ |
|---|---|
| 18 Dimethyl-β-hydroxyethyl-γ-[octadecylamidolpropyl ammonium dihydrogen phosphate. | 434 |
| 19 do | 426 |
| 25 do | 434 |
| 28 do | 438 |
| 18 Poly-α-methylallylamino-guanidine acetate | 433 |
| 24 do | 434 |
| 19 Cetyl trimethyl ammonium bromide | 423 |
| 24 do | 430 |

EXAMPLE VIII

A sample of the emulsion coating of Example I was compared with a similar coating in which the α-benzoyl analogue of our coupler 4 was used. These film samples were compared for "printout," by exposing for 30 hours in a Xenon Arc Fadeometer. The film sample containing our coupler at the end of the test showed only a 0.5% reduction in transmission as compared to the 4.5% reduction shown by the film sample containing the α-benzoyl analogue of our coupler. The film samples were compared for yellowing by storing for one week at 140° F. and 75% RH. The film sample containing our coupler showed no reduction in transmission as compared to a 1% reduction in transmission produced by this treatment in the other film sample.

The valuable light absorbing properties illustrated in the examples above which characterize the dyes produced by color development of our novel couplers is further illustrated by the spectrophotometric curves shown by the accompanying drawings, FIGURES 1, 2, 3, 4 and 5.

FIGURES 1, 2 and 3 of the drawings show the spectrophotometric curves for the dyes produced by color development of coupler 11 in the emulsion of Example 4, coupler 2 in the emulsion of Example 3, and coupler 10 in the emulsion as described in Example 2, respectively. These figures demonstrate the high absorption our dyes have for blue light and the low and uniform absorption they have for green and red light which makes them very desirable for use in color photography.

Our dyes are not only characterized by having very deirable light absorption properties when they are originally formed but they retain these properties to an unexpected degree after being exposed to heat and light over a period of time.

Table E below illustrates the stability of dyes from representative couplers of our invention when they were exposed in a Xenon Arc Fadeometer.

TABLE E

| Dyes produced by color development of an exposed silver halide emulsion layer containing: | Decrease in dye denity at λmax.[1] |
|---|---|
| Coupler 4 with developer 1 | 0.12 |
| Coupler 6 with developer 1 | 0.11 |
| Coupler 9 with developer 2 | 0.10 |
| Coupler 10 with developer 2 | 0.12 |
| Coupler 14 with developer 1 | 0.12 |
| Coupler 15 with developer 1 | 0.10 |

[1] Produced by 30 hours' exposure in Fadeometer.

FIGURE 1 of the drawings further illustrates the good stability of our dyes to exposure to light. Spectrophotometric curves A, B and C represent the light absorption characteristics of our dye before exposure, after 30 hours' exposure, and after 50 hours' exposure in the Fadeometer, respectively showing that only a relatively small amount of dye fading was produced by this severe test. The basic shape of the curve is unchanged even after 50 hours of exposure.

FIGURE 3 of the drawings still further illustrates the characteristic stability of dyes from our couplers. Curves F and G were obtained for an emulsion containing the dye from our coupler 10, α-pivalyl-5-[γ'-(2,4-di-tert-amylphenoxy) - butyramido]-2-chloroacetanilide as formed and after 30 hours' exposure in the Xenon Arc Fadeometer. This treatment caused the dye to fade only 0.12 density unit.

The excellent stability of the dyes from our couplers is unexpected in view of the relatively poor stability of dyes from coupler analogues of our couplers. The importance of the tertiary carbon connected to the carbonyl group of our couplers is illustrated by a comparison of FIGURE 3 with FIGURE 4 and with FIGURE 5.

Spectrophotometric curves H and I of FIGURE 4 show the light absorption characteristics of the dye produced in an emulsion made as described in Example 1 but which contained the coupler α-(α'-methylbutyryl) - 5 - [γ''-(2,4-di - tert - amylphenoxy)-butyramido]-2-chloroacetanilide. This coupler is an isomer of coupler 10 (used to make the dyes illustrated in FIGURE 3) and differs from coupler 10 only in that it has a

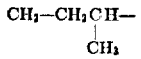

group attached to the carbonyl group in place of a $(CH_3)_3C$— group.

FIGURE 4 shows that 30 hours of exposure to the Xenon Arc Fadeometer reduced the dye density by 0.70 unit. The corresponding loss in density from our coupler shown in FIGURE 3 was only 0.11 density unit.

Spectrophotometric curves J and K of FIGURE 5 show the light absorption characteristics of the dye produced in an emulsion made as described in Example 1, but which contained the coupler α-(β'β'-dimethylbutyryl)-5-[α'' - (2,4-di-tert-amylphenoxy)acetamido] - 2 - chloroacetanilide in place of coupler 10. This coupler differs primarily from coupler 10 in that it has a —$CH_2$— group separating the tertiary butyl group from the carbonyl group of the coupler. The comparison between curves J and K show that 30 hours' exposure in the Fadeometer produced a loss in dye density of 0.45 density unit.

We claim:

1. A compound selected from those having the formulas:

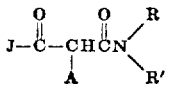

and

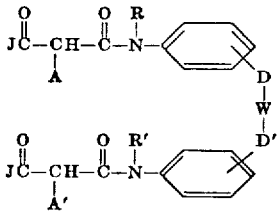

wherein J represents a member selected from the class consisting of a 1-alkyl-cyclohexyl radical in which the alkyl radical has from 1 to 18 carbon atoms, a 1-alkoxy-1-cyclohexyl radical in which the alkyl radical has from 1 to 18 carbon atoms, a 1-alkoxyalkyl-1-cyclohexyl radical in which the alkoxyalkyl radical has from 2 to 18 carbons atoms, 1-phenyl-1-cyclohexyl, 1-tolyl-1-cyclohexyl, 7,7-dimethylnorbornyl, a 2-alkyl - 7,7 - dimethylnorbornyl radical in which the alkyl group has from 1 to 18 carbons, 2-phenyl-7,7-dimethylnorbornyl and 2-tolyl-7,7-dimethylnorbornyl such that a tertiary carbon atom in the said J group is attached directly to the carbonyl group of the coupler moiety and such that the J group taken together with the carbonyl group has from 5 to 32 carbon atoms; A and A' each represents a member selected from the class consisting of the hydrogen atom, the chlorine atom, the bromine atom and an —SB radical; B represents a member selected from the class consisting of 1,3,4-oxadiazolyl, benzoxazoyl, phenyltetrazolyl, a 3-alkylcarbamylphenyl in which the alkyl group has from 1 to 18 carbon atoms, a 3-alkyl-4-methoxyphenyl in which the alkyl group has from 1 to 18 carbon atoms, a dialkyl-4-aminophenyl radical in which the alkyl groups have from 1 to 18 carbon atoms, and octadecyl; R and R' each represent a member selected from the class consisting of phenyl, 2-chlorophenyl, 4-sulfophenyl, 2-dimethylaminophenyl, a 2-halo-5-alkamidophenyl radical, a 2-methoxy-5-alkamidophenyl radical, a 4-alkamidophenyl radical, a 4-methoxyphenyl radical, a 4-sulfamylphenyl radical, a 2-chloro - sulfonamidophenyl radical, 3,5 - dicarboxyphenyl, alkyl esters of 3,5-dicarboxyphenyl in which the alkyl moiety has from 1 to 18 carbon atoms, a 2-phenoxy-5-carbamylphenyl radical, 3,5-dicarbamylphenyl, hydrogen, an alkyl group of from 1 to 18 carbon atoms, thienyl, 5-carbethoxythienyl, 5-carbethoxyfuryl, thiazoyl, 4-methylthiazolyl, 4-phenylthiazolyl, 4-furylthiazolyl, 4-methyl-5-carboxymethylthiazolyl, 4,5-diphenylthiazolyl, 4-carboxymethylthiazolyl, 4-m- or p-acylaminophenylthiazolyl, 4,5-dicarbethoxythiazolyl, 4-methyl - 5 - carboxymethylthiazolyl, 4-methyl - 5 - carbethoxythiazolyl, 5-carboxythiazolyl, 5 - carbomethoxythiazolyl, 5 - carbethoxythiazolyl, benzthiazolyl, oxazolyl, imidazolyl, benzimidazolyl, pyridyl, 5-acylaminopyridyl, quinolyl, 2,6-dihydroxy - 4-methylpyrimidyl, 5-carbomethoxyethyl - 1,3,4 - thiadiazolyl, 1,3,4-oxodiazolyl, a 1,2,4-triazolyl radical and 1,3,5-triazinyl; D and D' each represent a member selected from the class consisting of the

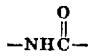

group, the

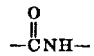

group, the —$NHSO_2$— group and the —$SO_2NH$— group; and W represents a bivalent group selected from the class consisting of a phenylene group and an alkylene group.

2. The yellow dye-forming coupler α-pivalyl-5-[γ'-(2,4-di-tert-amylphenoxy)-butyramido]-2-chloroacetanilide.

3. The yellow dye-forming coupler α-pivalyl-5-[α'-(2,4-di-tert-amylphenoxy)acetamido]-2-chloroacetanilide.

4. The yellow dye-forming coupler α-(1-methylcyclohexane-1-carbonyl) - 5 - [γ-(2,4-di-tert-amylphenoxy)-butyramido]-2-chloroacetanilide.

5. The yellow dye-forming coupler α-(α'-methoxyisobutyryl) - 5 - [α''-(2,4-di-tert-amylphenoxy)acetamido]-2-chloroacetanilide.

6. The yellow dye-forming coupler α-(7,7-dimethylnorbornane-1-carbonyl) - 5 - [γ-(2,4-di-tert-amylphenoxy) butyramido-2-chloroacetanilide.

7. The yellow dye-forming coupler α-pivalyl-α-(3-octadecylcarbamylphenylthio)-4 - sulfoacetanilide potassium salt.

*8. A compound selected from those having the formulas:*

*I*

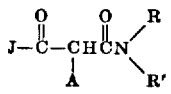

*and*

*IA*

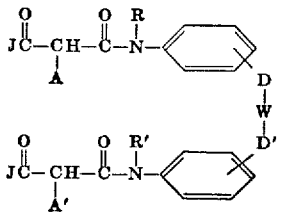

*wherein J represents a member selected from the class consisting of a 1-alkyl-cyclohexyl radical in which the alkyl radical has from 1 to 18 carbon atoms, a 1-alkoxy-1-cyclohexyl radical in which the alkyl radical has from 1 to 18 carbon atoms, a 1-alkoxyalkyl-1-cyclohexyl radical in which the alkoxyalkyl radical has from 2 to 18 carbons atoms, 1-phenyl-1-cyclohexyl, 1-tolyl-1-cyclohexyl, 7,7-dimethylnorbornyl, a 2-alkyl-7,7-dimethylnorbornyl radical in which the alkyl group has from 1 to 18 carbons, 2-phenyl-7,7-dimethylnorbornyl and 2-tolyl-7,7-dimethylnorbornyl such that a tertiary carbon atom in the said J*

*group is attached directly to the carbonyl group of the coupler moiety and such that the J group taken together with the carbonyl group has from 5 to 32 carbon atoms; A and A' each represents a member selected from the class consisting of the hydrogen atom, the chlorine atom, the bromine atom and an —SB radical; B represents a member selected from the class consisting of 1,3,4-oxadiazolyl, benzoxazoyl, phenyltetrazolyl, a 3-alkylcarbamylphenyl in which the alkyl group has from 1 to 18 carbon atoms, a 3-alkyl-4-methoxyphenyl in which the alkyl group has from 1 to 18 carbon atoms, a dialkyl-4-aminophenyl radical in which the alkyl groups have from 1 to 18 carbon atoms, and octadecyl; R and R' each represent a member selected from the class consisting of phenyl, 2-chlorophenyl, 4-sulfophenyl, 2-dimethylaminophenyl, a 2-halo-5-alkamidophenyl radical, a 2-methoxy-5-alkamidopenyl radical, a 4-alkamidophenyl radical, a 4-methoxyphenyl radical, a 4-sulfamylphenyl radical, a 2-chloro-5-sulfonamidophenyl radical, 3,5-dicarboxyphenyl, alkyl esters of 3,5-dicarboxyphenyl in which the alkyl moiety has from 1 to 18 carbon atoms, a 2-phenoxy-5-carbamylphenyl radical, 3,5-dicarbamylphenyl, hydrogen, an alkyl group of from 1 to 18 carbon atoms, thienyl, 5-carbethoxythienyl, 5-carbethoxyfuryl, thiazolyl, 4-methylthiazolyl, 4-phenylthiazolyl, 4-furylthiazolyl, 4-methyl - 5 - carboxymethylthiazolyl, 4,5 - diphenylthiazolyl, 4 - carboxymethylthiazolyl, 4-m- or p-acylaminophenylthiazolyl, 4,5-dicarbethoxythiazolyl, 4-methyl - 5 - carboxymethylthiazolyl, 4-methyl - 5 - carbethoxythiazolyl, 5-carboxythiazolyl, 5 - carbomethoxythiazolyl, 5 - carbethoxythiazolyl, benzthiazolyl, oxazolyl, imidazolyl, benzimidazolyl, pyridyl, 5-acylaminopyridyl, quinolyl, 2,6-dihydroxy-4-methylpyrimidyl, 5-carbomethoxyethyl-1,3,4-thiadiazolyl, 1,3,4-oxodiazolyl, a 1,2,4-triazolyl radical and 1,3,5-triazinyl, except that R in formula I is defined as phenyl, 2-chlorophenyl, 4-sulfophenyl, 2-dimethylaminophenyl, a 2-halo-5-alkamidophenyl radical, a 2-methoxy-5-alkamidophenyl radical, a 4-alkamidophenyl radical, a 4-methoxyphenyl radical, a 4-sulfamylphenyl radical, a 2-chloro - 5 - sulfonamidophenyl radical, 3-5-dicarboxyphenyl, alkyl esters of 3,5-dicarboxyphenyl in which the alkyl moiety has from 1 to 18 carbon atoms, a 2-phenoxy-5-carbamylphenyl radical or 3,5-dicarbamylphenyl; D and D' each represent a member selected from the class consisting of the*

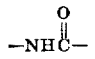

*group, the*

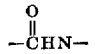

*group, the —$NHSO_2$— group and the —$SO_2NH$— group; and W represents a bivalent group selected from the class consisting of a phenylene group and an alkylene group.*

*9. A compound having the formula*

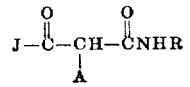

*wherein J represents a member selected from the class consisting of 1-alkyl-cyclohexyl radical in which the alkyl radical has from 1 to 18 carbon atoms, a 1-alkoxy-1-cyclohexyl radical in which the alkyl radical has from 1 to 18 carbon atoms, a 1-alkoxyalkyl-1-cyclohexyl radical in which the alkoxyalkyl radical has from 2 to 18 carbon atoms, 1-phenyl-1-cyclohexyl, 1-tolyl-1-cyclohexyl, 7,7-dimethylnorbornyl, a 2-alkyl-7,7-dimethylnorbornyl radical in which the alkyl group has from 1 to 18 carbons, 2-phenyl-7,7-dimethylnorbornyl and 2-tolyl-7,7-dimethylnorbornyl such that a tertiary carbon atom in the said J group is attached directly to the carbonyl group of the coupler moiety and such that the J group taken together with the carbonyl group has from 5 to 32 carbon atoms; A represents a member selected from the class consisting of the hydrogen atom, the chlorine atom, the bromine atom and an —SB radical in which B represents a member selected from the class consisting of 1,3,4-oxadiazolyl, benzoxazoyl, phenyltetrazolyl, a 3-alkylcarbamylphenyl in which the alkyl group has from 1 to 18 carbon atoms, a 3-alkyl-4-methoxyphenyl in which the alkyl group has from 1 to 18 carbon atoms, and a dialkyl-4-aminophenyl radical in which the alkyl groups have from 1 to 18 carbon atoms and octadecyl; R is a member selected from the class consisting of a phenyl, 2-chlorophenyl, 2-dimethylaminophenyl, a 2-halo-5-alkamidophenyl radical, a 2-methoxy-5-alkamidophenyl radical, a 4-alkamidophenyl radical, a 4-methoxyphenyl radical, a 4-sulfamylphenyl radical, a 2-chloro-5-sulfonamidophenyl radical, 3,5-dicarboxyphenyl, alky esters of 3,5 - dicarboxypheny in which the alkyl moiety has from 1 to 18 carbon atoms, a 2-phenoxy-5-carbamylphenyl radical, and 3,5-dicarbamylphenyl radical.*

References Cited

The following references, cited by the Examiner, are of record in the patented file of this patent or the original patent.

UNITED STATES PATENTS 2,950,314 8/1960 De Cat et al. ------ 260—507 R

OTHER REFERENCES

Wahlberg, Chemical Abstracts *15*, 1490–1492 (1921).

DANIEL D. HORWITZ, Primary Examiner

U.S. Cl. X.R.

96—55, 56.2, 56.3, 56.4, 56.5, 56.6, 100; 260—247.7 R, 249.5, 256.4 R, 256.5 R, 287 R, 204.8 R, 295 R, 305, 306.8 R, 307 R, 308 R, 309, 309.2 R, 347.2, 347.3, 397.7, 319, 556 R, 557 R, 558 R, 559 R, 561 R, 562 R